(12) United States Patent
Takao

(10) Patent No.: US 10,122,911 B2
(45) Date of Patent: Nov. 6, 2018

(54) IMAGE PICKUP APPARATUS, CONTROL METHOD, AND NON-TRANSITORY COMPUTER-READABLE STORAGE MEDIUM WITH ABERRATION AND OBJECT INFORMATION ACQUISITION FOR CORRECTING AUTOMATIC FOCUS DETECTION

(71) Applicant: CANON KABUSHIKI KAISHA, Tokyo (JP)

(72) Inventor: Yumi Takao, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/413,487

(22) Filed: Jan. 24, 2017

(65) Prior Publication Data
US 2017/0230567 A1    Aug. 10, 2017

(30) Foreign Application Priority Data

Feb. 9, 2016    (JP) .................................. 2016-022746

(51) Int. Cl.
*H04N 5/235*    (2006.01)
*H04N 5/232*    (2006.01)
(Continued)

(52) U.S. Cl.
CPC .......... *H04N 5/23212* (2013.01); *G02B 7/36* (2013.01); *G02B 7/365* (2013.01); *G06T 5/003* (2013.01);
(Continued)

(58) Field of Classification Search
CPC .. H04N 5/23212; H04N 5/3572; H04N 9/045; H04N 2209/041; G02B 7/36; G02B 7/365; G06T 5/003; G06T 7/90
See application file for complete search history.

(56) References Cited

U.S. PATENT DOCUMENTS 6,363,220 B1 *  3/2002  Ide .......................... G02B 7/08
                                                        348/345
7,456,886 B2    11/2008  Shinohara
(Continued)

FOREIGN PATENT DOCUMENTS

JP    2003-241064 A    8/2003
JP    2004-134867 A    4/2004
(Continued)

OTHER PUBLICATIONS

Office Action dated Sep. 4, 2018, in Japanese Patent Application No. 2016-022746.

*Primary Examiner* — Ngoc-Yen Vu
(74) *Attorney, Agent, or Firm* — Fitzpatrick, Cella, Harper & Scinto

(57) ABSTRACT

An image pickup apparatus is capable of executing automatic focus detection of an imaging optical system, and includes a first acquisition unit configured to acquire aberration information of the imaging optical system, a second acquisition unit configured to acquire object information of an object in a focus detecting area, a calculation unit configured to calculate, based on the aberration information of the imaging optical system and the object information, a correction value used to correct a difference between a focus state of a captured image and a result of the automatic focus detection, caused by the aberration of the imaging optical system, and a correction unit configured to correct the result of the automatic focus detection using the correction value.

17 Claims, 12 Drawing Sheets

(51) Int. Cl.
*G06T 5/00* (2006.01)
*G06T 7/90* (2017.01)
*G02B 7/36* (2006.01)
G03B 13/00 (2006.01)
H04N 9/04 (2006.01)
H04N 5/357 (2011.01)

(52) U.S. Cl.
CPC ................ *G06T 7/90* (2017.01); *G06T 5/006* (2013.01); *H04N 5/3572* (2013.01); *H04N 9/045* (2013.01); *H04N 2209/041* (2013.01)

(56) References Cited

U.S. PATENT DOCUMENTS

| | | | | |
|---|---|---|---|---|
| 8,184,197 B2* | 5/2012 | Deng | ..................... | G02B 7/285 348/345 |
| 8,514,321 B2* | 8/2013 | Park | ......................... | G01J 3/02 348/336 |
| 8,531,545 B2* | 9/2013 | Kosaka | .................. | H04N 9/045 348/222.1 |
| 8,792,028 B2* | 7/2014 | Ni | ........................ | H04N 5/3572 348/273 |
| 8,952,306 B2* | 2/2015 | Yoshida | .................. | G02B 7/28 250/201.4 |
| 9,485,409 B2 | 11/2016 | Takao | | |
| 2015/0207984 A1 | 7/2015 | Hamano et al. | | |
| 2015/0316833 A1 | 11/2015 | Watanabe et al. | | |

FOREIGN PATENT DOCUMENTS

| JP | 4504031 B2 | | 4/2010 |
|---|---|---|---|
| JP | 2013-029656 | * | 2/2013 |
| JP | 2015-138200 A | | 7/2015 |
| JP | 2015-222411 A | | 12/2015 |
| JP | 2016-018012 A | | 2/2016 |

* cited by examiner

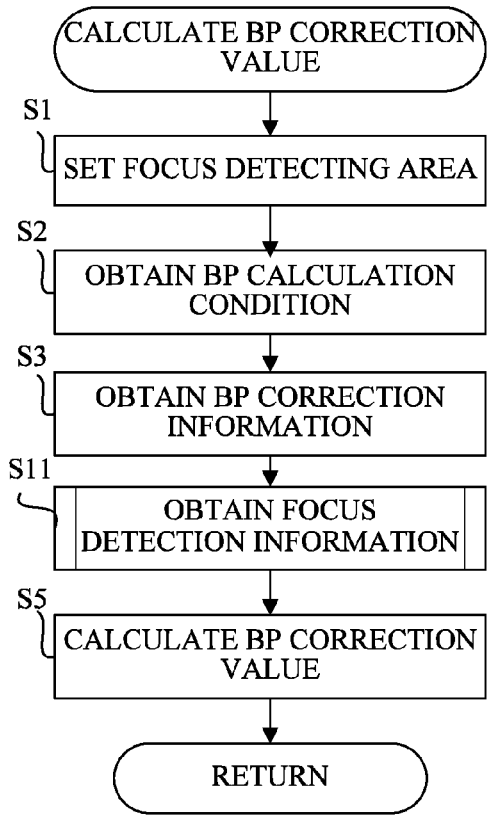
FIG. 7A
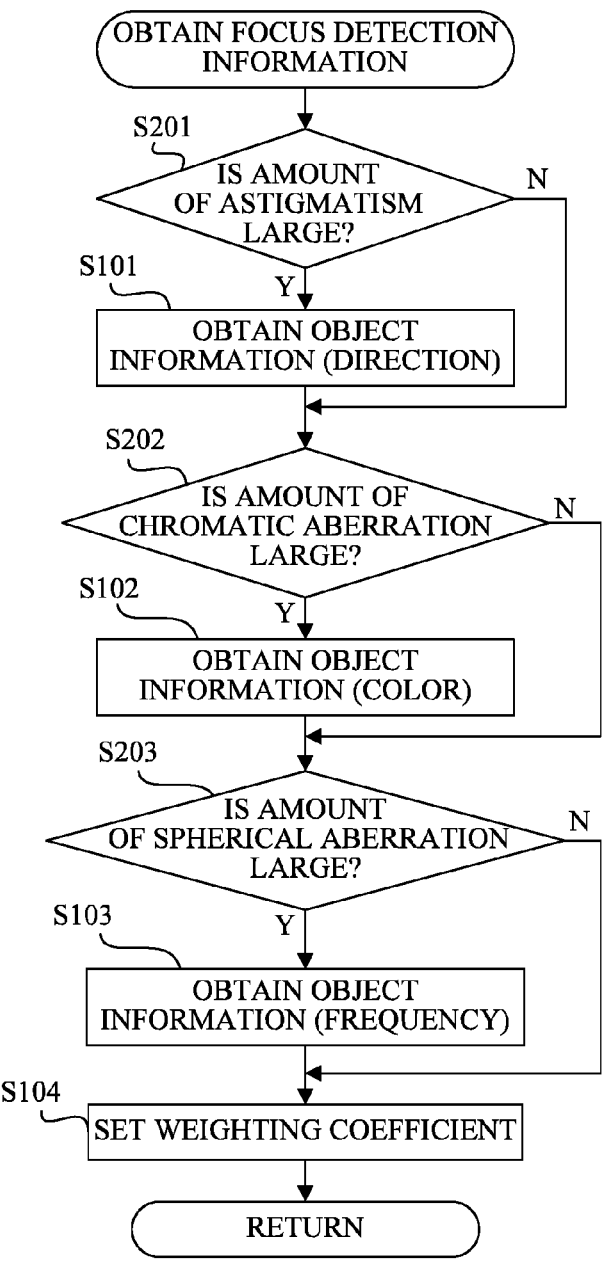
FIG. 7B
| Fg_C | 0 |
| Fg_D | 1 |
| Fg_Fq | 1 |
FIG. 7C

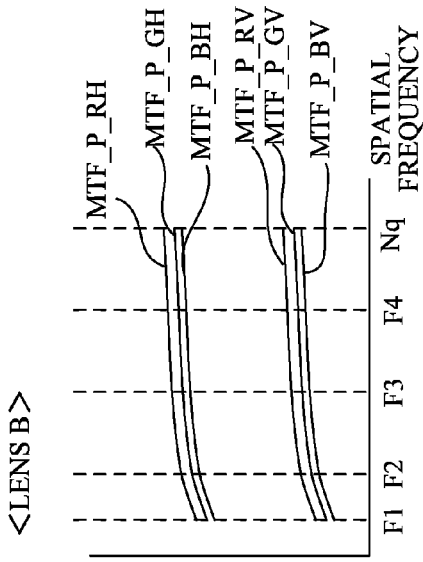
FIG. 10A
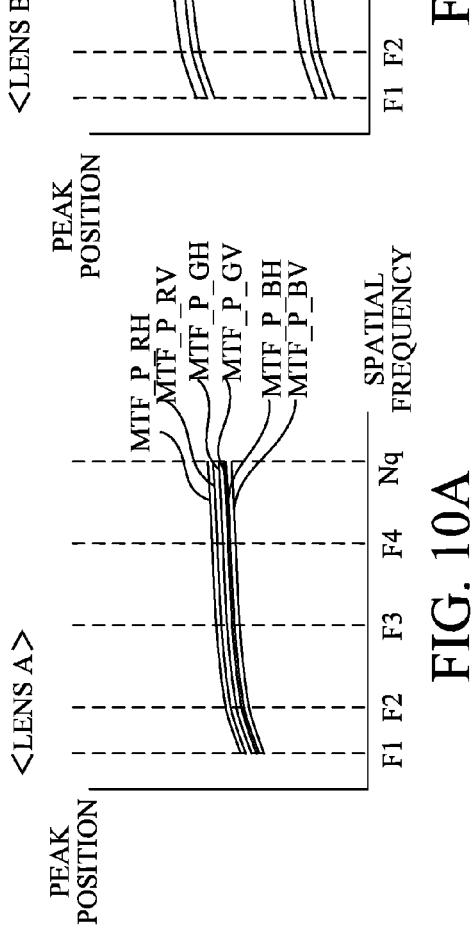
FIG. 10B
FIG. 10C
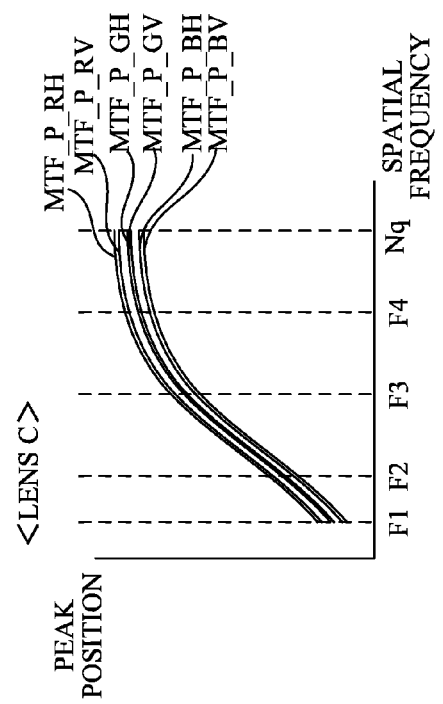
|  | LENS A | LENS B | LENS C |
|---|---|---|---|
| Fg_C | 0 | 0 | 0 |
| Fg_D | 0 | 1 | 0 |
| Fg_Fq | 0 | 0 | 1 |
FIG. 10D

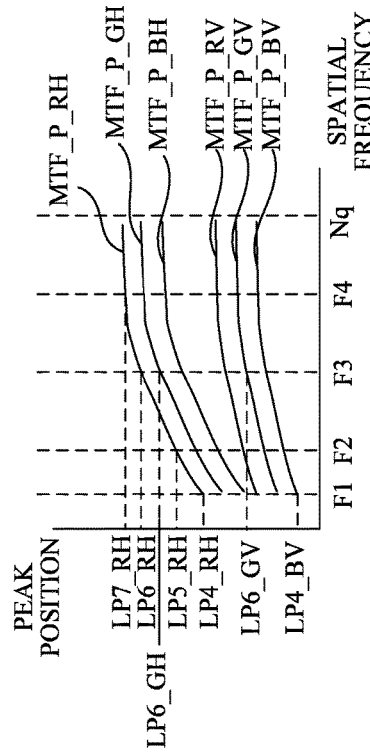
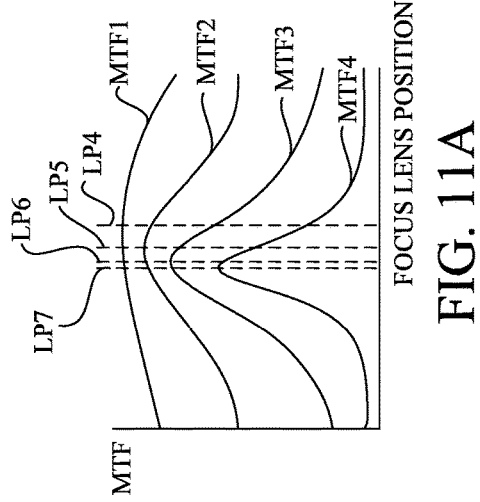
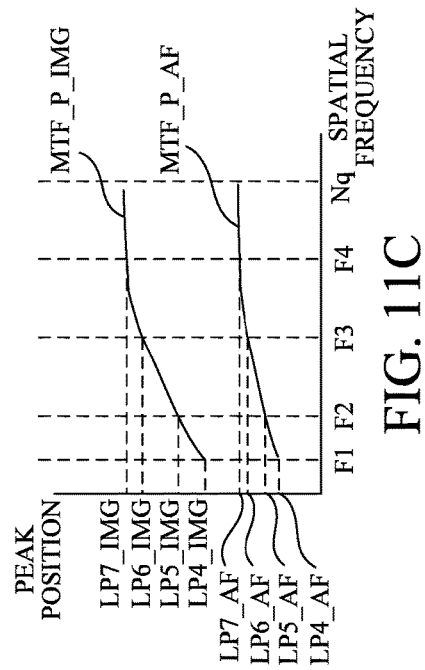
FIG. 11A
FIG. 11B
FIG. 11C
FIG. 11D

IMAGE PICKUP APPARATUS, CONTROL METHOD, AND NON-TRANSITORY COMPUTER-READABLE STORAGE MEDIUM WITH ABERRATION AND OBJECT INFORMATION ACQUISITION FOR CORRECTING AUTOMATIC FOCUS DETECTION

BACKGROUND OF THE INVENTION

Field of the Invention

The present invention relates generally to a control method, and more particularly to a control method for an image pickup apparatus configured to correct a focus detecting error caused by an aberration of an optical system.

Description of the Related Art

The contrast autofocus (AF) method and the phase difference AF method are known AF methods for an image pickup apparatus. The contrast AF method and the phase difference AF method are widely accepted AF methods for a video camera and a digital still camera, and some image sensors serve as a focus detecting sensor.

Since these AF methods detect a focus state using an optical image, the aberration of an optical system configured to form the optical image may give an error to the focus detection result. Accordingly, a method for reducing this error has been proposed.

Japanese Patent No. 4,504,031 discloses a method for specifying a type of light source based on a distribution characteristic of a light quantity of an object, and for correcting a focus detecting error caused by a chromatic aberration, using previously stored correction data of the specified light source.

Japanese Patent Laid-Open No. 2003-241064 discloses a method for detecting a dominant wavelength based on a wavelength distribution of an object, and for correcting a focus detecting error caused by a chromatic aberration using previously stored correction data corresponding to the dominant wavelength for each wavelength.

The conventional method cannot provide a quick correction corresponding to a characteristic of the object, and has insufficient accuracy.

Japanese Patent No. 4,504,031 needs to store the correction data for each predicted light source, requires a heavy calculation load for specifying the light source, and has only a limited correction effect to a specific light source.

Japanese Patent Laid-Open No. 2003-241064 converts the correction data into a function for each wavelength, reduces a storage capacity, and provides a correction corresponding to the object. However, this method provides the correction corresponding to the dominant wavelength of the light source, and thus cannot provide a correction using a wavelength distribution according to the image capturing characteristic and the focus detection characteristic or provide a sufficient correction precision.

One common problem is that the correction is unnecessary when a focus detecting error caused by the chromatic aberration is small, and this correction causes a calculation load. Since a lens interchangeable type correction system has a different aberrational state for each optical system, individual unit, and type of a camera, a storage of a huge amount of correction data is necessary so as to handle a correction of every combination.

SUMMARY OF THE INVENTION

The present invention provides a control method, an image pickup apparatus, and a computer-readable storage medium, advantageous to an automatic focus detection in the image pickup apparatus.

An image pickup apparatus according to the present invention is capable of executing automatic focus detection of an imaging optical system. The image pickup apparatus includes a first acquisition unit configured to acquire aberration information of the imaging optical system, a second acquisition unit configured to acquire object information of an object in a focus detecting area, a calculation unit configured to calculate, based on the aberration information of the imaging optical system and the object information, a correction value used to correct a difference between a focus state of a captured image and a result of the automatic focus detection, caused by the aberration of the imaging optical system, and a correction unit configured to correct the result of the automatic focus detection using the correction value.

Further features of the present invention will become apparent from the following description of exemplary embodiments with reference to the attached drawings.

BRIEF DESCRIPTION OF THE DRAWINGS

FIGS. 7A, 7B, and 7C are flowcharts for explaining an automatic focus detection operation and a view illustrating illustrative determination flags according to a second embodiment of the present invention.

FIGS. 10A, 10B, 10C, and 10D are views illustrating aberration information examples and determination flags for lenses A, B and C according to a fourth embodiment of the present invention.

FIGS. 11A, 11B, 11C, and 11D are views illustrating aberration information examples of the optical system and weighting information examples according to one embodiment of the present invention.

DESCRIPTION OF THE EMBODIMENTS

Referring now to the accompanying drawings, a description will be given of illustrative embodiments of the present invention. For better understanding and simple description, each embodiment has a concrete and specific configuration but the present invention is not limited to such a configuration. For example, the present invention is configured as a lens interchangeable type single-lens reflex digital camera in each embodiment, but the present invention is applicable to a lens integrated type digital camera and video camera. The present invention is also applicable to an arbitrary electronic apparatus provided with a camera, such as a cellular phone, a personal computer (a laptop computer, a tablet computer, and a desktop type), a game machine, etc.

First Embodiment

Description of a Configuration of an Image Pickup Apparatus: a Lens Unit

Figure 2:
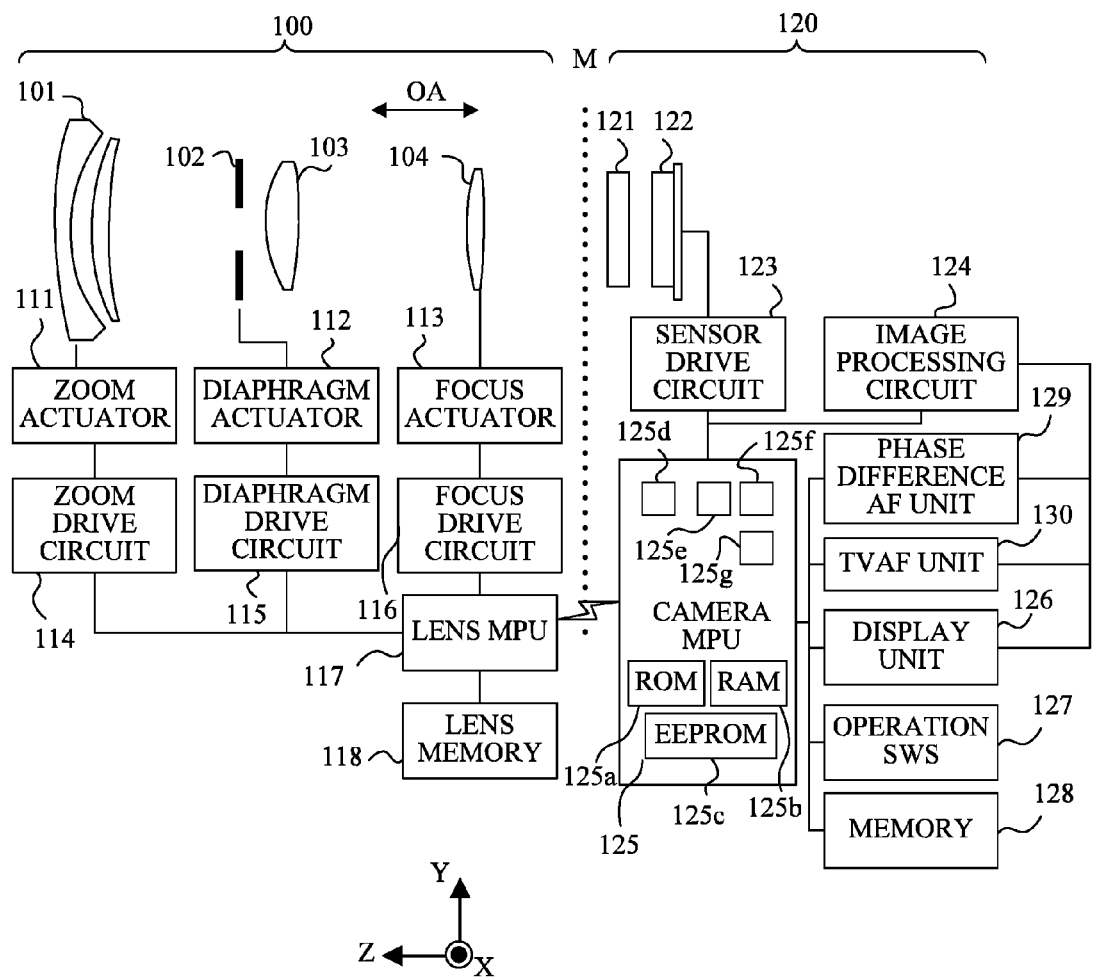
FIG. 2 is a block diagram of an image pickup apparatus according to one embodiment of the present invention.

FIG. 2 is a block diagram illustrating a functional configuration example of a digital camera as one example of the image pickup apparatus according to one embodiment of the present invention. The digital camera according to this embodiment is a lens interchangeable type single-lens reflex camera, and includes a lens unit 100 and a camera body 120. The camera body 120 is mounted with the lens unit 100 via a mount M illustrated by a dotted line at the center in FIG. 2.

The lens unit 100 includes an optical system and a drive/control system. The (imaging) optical system includes a first lens unit 101, a diaphragm 102, a second lens unit 103, and a focal lens unit (referred to as a "focus lens" hereinafter) 104 in this embodiment. Thus, the lens unit 100 is an image capturing lens that includes the focus lens 104 and is configured to form an optical image.

The first lens unit 101 is arranged at the top of the lens unit 100, and held movable in an optical axis direction OA. The diaphragm 102 serves to adjust the light quantity in image capturing and serves as a mechanical shutter configured to control an exposure time period in still image capturing. The diaphragm 102 and the second lens unit 103 are integrally movable in the optical axis direction OA for zooming in association with the first lens unit 101. The focus lens 104 is also movable in the optical axis direction OA, and an object distance (focal length) to be focused by the lens unit 100 changes according to its position. Controlling the position of focus lens 104 in the optical axis direction OA provides focusing that adjusts the focal length of the lens unit 100.

The drive/control system includes a zoom actuator 111, a diaphragm actuator 112, a focus actuator 113, a zoom drive circuit 114, a diaphragm drive circuit 115, a focus drive circuit 116, a lens MPU 117, and a lens memory 118.

The zoom drive circuit 114 drives the first lens unit 101 and the third lens unit 103 in the optical axis direction OA through the zoom actuator 111, and controls an angle of view of the optical system in the lens unit 100. The diaphragm drive circuit 115 drives the diaphragm 102 through the diaphragm actuator 112, and controls an opening diameter and opening/closing action of the diaphragm 102. The focus drive circuit 116 drives the focus lens 104 in the optical axis direction OA through the focus actuator 113, and controls a focal length of the optical system in the lens unit 100. The focus drive circuit 116 detects a current position of the focus lens 104 through the focus actuator 113.

The lens MPU (processor) 117 governs all calculations and controls relating to the lens unit 100, and controls the zoom drive circuit 114, the diaphragm drive circuit 115, and the focus drive circuit 116. The lens MPU 117 is connected with a camera MPU 125 through the mount M, and communicates a command and data. For example, the lens MPU 117 detects the position of the focus lens 104, and notifies the lens position information in response to a request from the camera MPU 125. This lens position information includes information, such as the position of the focus lens 104 in the optical axis direction OA, a position and a diameter of an exit pupil in the optical axis direction OA where the optical system is not moving, and a position and a diameter in the optical axis direction OA of a lens frame configured to restrict a light flux from the exit pupil. The lens MPU 117 controls the zoom drive circuit 114, the diaphragm drive circuit 115, and the focus drive circuit 116 in response to a request from the camera MPU 125. The lens memory 118 previously stores optical information necessary for the automatic focus detection. The camera MPU 125 controls the operation of the lens unit 100, for example, by executing a program stored in a built-in nonvolatile memory and the lens memory 118.

Description of the Configuration of the Image Pickup Apparatus: Camera Body

The camera body 120 includes an optical system (an optical low-pass filter 121 and an image sensor 122) and a drive/control system. An imaging optical system includes the first lens unit 101, the diaphragm 102, the second lens unit 103, the focus lens 104 in the lens unit 100, and the optical low-pass filter 121 in the camera body 120. Thus, the imaging optical system includes a plurality of optical elements.

The optical low-pass filter 121 reduces the false color and moiré in a captured image. The image sensor 122 includes a CMOS image sensor and a peripheral circuit, in which m pixels are arranged in a horizontal direction and n pixels are arranged in a vertical direction (n and m are integers equal to or greater than 2). The image sensor 122 according to this embodiment has a pupil division function, and can provide the phase difference AF (image capturing plane phase difference AF) using the image data. The image processing circuit 124 generates the data for the phase difference AF, and the image data for display, recording, and the contrast AF (TVAF) based on the image data output from the image sensor 122.

The drive/control system includes a sensor drive circuit 123, an image processing circuit 124, a camera MPU 125, a display unit 126, operational switches 127, a memory 128, a phase difference AF unit 129, and a TVAF unit 130.

The sensor drive circuit 123 controls operations of the image sensor 122, A/D-converts the acquired image signal, and transmits the result to the camera MPU 125. The image processing circuit 124 performs general image processing performed in a digital camera, such as gamma conversion processing, white balance adjustment processing, color interpolation processing, and compression coding processing, for the image data obtained by the image sensor 122. The image processing circuit 124 also generates the signal used for the phase difference AF.

The camera MPU (processor) 125 serves as a control apparatus configured to govern all calculations and controls relating to the camera body 120. The camera MPU 125 controls the sensor drive circuit 123, the image processing circuit 124, the display unit 126, the operational switches 127, the memory 128, the phase difference AF unit 129, and the TVAF unit 130. The camera MPU 125 is connected to the lens MPU 117 via signal lines in the mount M, and communicates the command and data with the lens MPU 117. The camera MPU 125 requests the lens MPU 117 to acquire a lens position or to drive the diaphragm, the focus lens, and the zoom lens, by predetermined drive amounts, to acquire optical information peculiar to lens unit 100, etc. The camera MPU 125 includes a ROM 125a configured to store a program that controls a camera operation, a RAM 125b configured to store a variable, and an EEPROM 125c configured to store a variety of parameters. The camera MPU 125 includes an acquisition unit 125d configured to acquire information, such as aberrational information of the imaging optical system, color information, angular information, and spatial frequency information of the object, as described later. The camera MPU 125 includes a correction unit 125e configured to correct a signal (focus detection result) corresponding to the focus state of the imaging optical system, as described later. The correction unit 125e of this embodiment corrects a focus detection signal (focus detection result) in order to correct the focus detecting error caused by the aberration of the imaging optical system. The camera MPU 125 includes a control unit 125f configured to control the position of the focus lens 104 based on the corrected focus detection signal (focus detection result), as described later. The camera MPU 125 includes a setting unit 125g configured to set a weighting coefficient according to the object information, as described later.

The display unit 126 includes a LCD etc., and displays the information on the image capturing mode of the camera, the pre-captured preview image and a post-captured image to be confirmed, a focused image in the focus detection, etc. The operational switches 127 include a power switch, a release (image pickup trigger) switch, a zooming switch, an image capturing mode selecting switch, etc. The memory 128 as a recording unit in this embodiment is a removable flash memory, and records the captured image.

The phase difference AF unit 129 performs focus detection processing with the phase difference detection method using the focus detecting data obtained by the image processing circuit 124. More specifically, the image processing circuit 124 generates a pair of image data as focus detecting data formed by light fluxes that have passed through a pair of pupil areas in the imaging optical system, and the phase difference AF unit 129 detects a defocus amount based on a shift amount between the pair of image data. The phase difference AF unit 129 serves as a focus detector configured to detect the signal according to the focus state of the imaging optical system. The phase difference AF unit 129 in this embodiment performs a phase difference AF (image capturing plane phase difference AF) based on the output of image sensor 122 without using a dedicated AF sensor. A detailed description will be given of the phase difference AF unit 129 later.

The TVAF unit 130 performs the focus detection processing with the contrast method based on the TVAF evaluation value (contrast information of the image data) generated by the image processing circuit 124. The focus detection processing with the contrast method moves the focus lens 104 and detects as an in-focus position the position of the focus lens 104 which provides a peak of the evaluation value. Therefore, the TVAF unit 130 serves as a focus detector configured to detect the signal according to the focus state of the imaging optical system.

The digital camera according to this embodiment can perform both the phase difference AF and the TVAF, and selectively use one or both of them according to the situation.

Description of the Focus Detection Operation: Phase Difference AF

A detailed description will now be given of an operation of the phase difference AF unit 129 and the TVAF unit 130.

Initially, the operation of the phase difference AF unit 129 will be described.

Figure 3A:
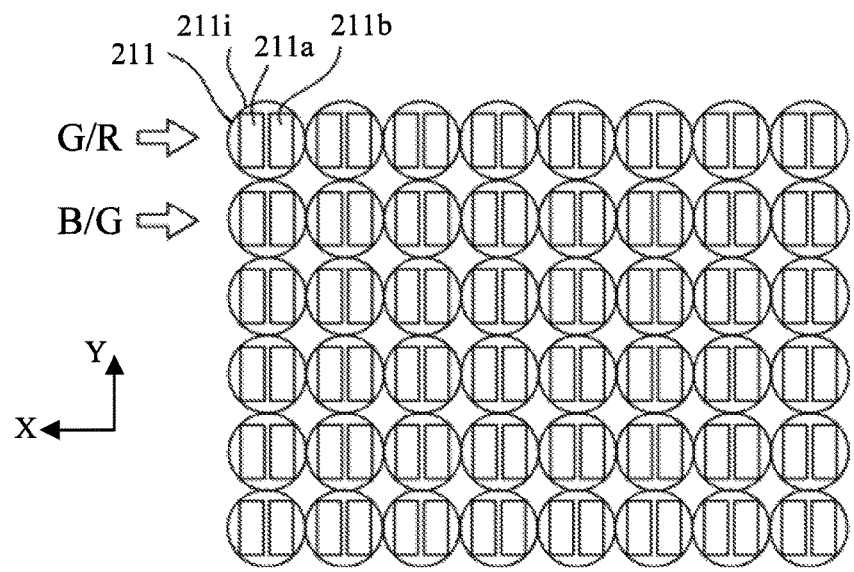
FIGS. 3A and 3B are views of illustrative configurations of a pixel arrangement and a read circuit in an image sensor according to one embodiment of the present invention.

FIG. 3A is a view illustrating the pixel arrangement on the image sensor 122 in this embodiment, obtained by observing from the lens unit 100 side a range of vertical six columns (in the Y direction) and horizontal eight rows (in the X direction) on a two-dimensional C-MOS area sensor. The image sensor 122 includes the color filters in the Bayer arrangement, in which green (G) and red (R) color filters are alternately arranged in order from the left on pixels in odd lines and the blue (B) and green (G) color filters are alternately arranged in order from the left on pixels in even lines. In a pixel 211, a circle 211i denotes an on-chip micro lens, and a plurality of rectangles 211a and 211b in the on-chip micro lens are photoelectric converters, respectively.

The photoelectric converters 211a and 211b in all the pixels 211 are divided into two in the X direction in the image sensor 122 in this embodiment, and a photoelectric conversion signal of an individual photoelectric converter and a sum of photoelectric conversion signals are independently read. A signal corresponding to a photoelectric conversion signal of one photoelectric converter can be acquired by subtracting a photoelectric conversion signal of the other photoelectric converter from the sum of the photoelectric conversion signals. The photoelectric conversion signal in each photoelectric converter can be used as data for the phase difference AF, or used to generate a parallax image that constitutes a 3D (three-dimensional) image. The sum of the photoelectric conversion signals can be used as usual captured image data.

A description will be given of the pixel signal in the phase difference AF. As detailed later, this embodiment divides a pupil for the exit light flux from the imaging optical system through the micro lens 211i in FIG. 3A and the divided photoelectric converters 211a and 211b. Now assume that an A image used for the AF is a combined and compiled output of the photoelectric converter 211a, and a B image used for the AF is a combined and compiled output of the photoelectric converter 211b, for a plurality of pixels 211 in a predetermined range arranged on the same pixel line. The outputs from the photoelectric converters 211a and 211b use a pseudo luminance (Y) signal calculated by adding red, and blue, and green outputs contained in the unit arrangement of the color filter. The A and B images used for the AF may be compiled for each of the red, blue, and green colors. A defocus amount in the predetermined range can be detected by detecting a relative image shift amount between the thus generated A and B images used for the AF, through a correlation calculation. This embodiment reads the sum of the output of one photoelectric converter and the outputs of all photoelectric converters from the image sensor 122. For example, when the sum of the output of photoelectric converter 211a and the outputs of photoelectric converters 211a and 211b are read out, the output of photoelectric converter 211b is acquired by subtracting the output of photoelectric converter 211a from the sum. This configuration can obtain both the A and B images used for the AF, and realize the phase difference AF. Since this image sensor is known as disclosed in Japanese Patent Laid-Open No. 2004-134867, a detailed description thereof will be omitted.

Figure 3B:
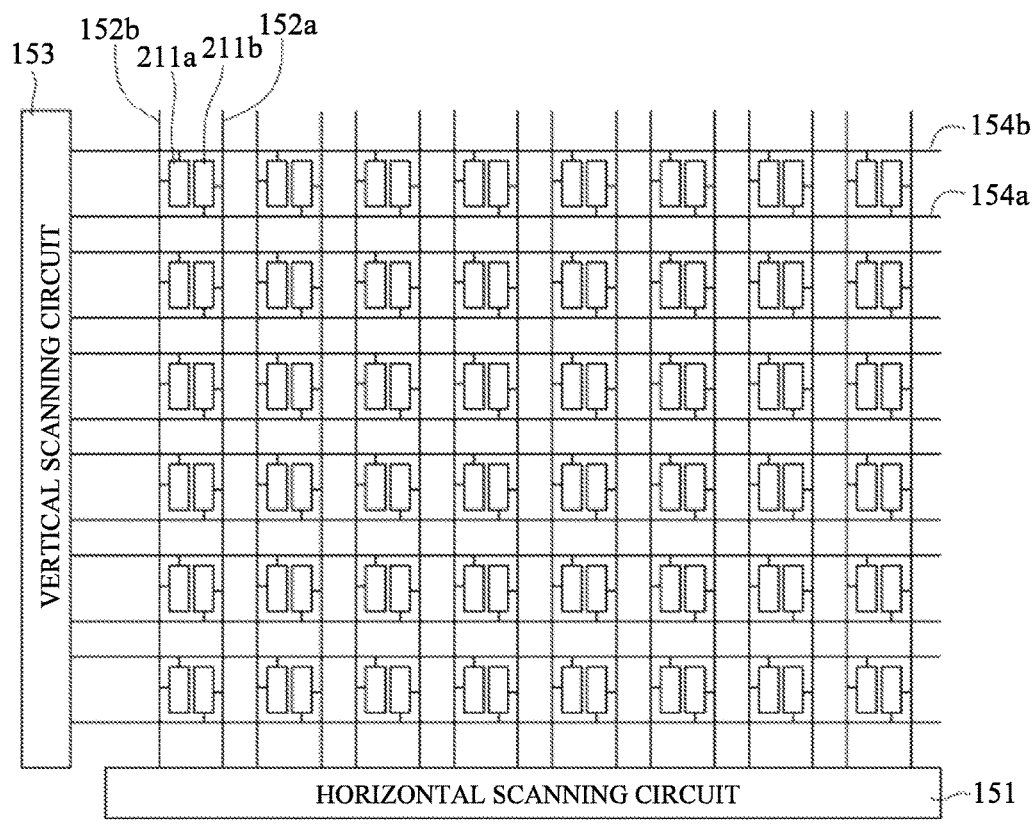

FIG. 3B is a view illustrating an illustrative configuration of the read circuit in the image sensor 122 according to this embodiment. Reference numeral 151 denotes a horizontal scanning circuit and reference numeral 153 denotes a vertical scanning circuit. Horizontal scanning lines 152a and 152b and vertical scan lines 154a and 154b are wired with corresponding pixels, and a signal from each photoelectric converter is read out via these scan lines.

The image sensor of this embodiment has the following two types of read modes in addition to the read method in the above pixel. A first read mode is referred to as an overall pixel read mode for capturing a high resolution still image. This mode reads out signals from all pixels.

A second read mode is a thinning read mode used to record a motion image or to display a preview image. Since the necessary pixel number for this mode is smaller than the total number of pixels, only thinned pixels with a predetermined ratio in the X and Y directions are read out. The thinning read mode is also used for high-speed reading. In thinning pixels in the X direction, the S/N ratio is improved by adding the signals. In thinning pixels in the Y direction, the signal output in lines to be thinned is ignored. Usually, the phase difference AF and contrast AF are based on the signal read in the second read mode.

Figure 4A:
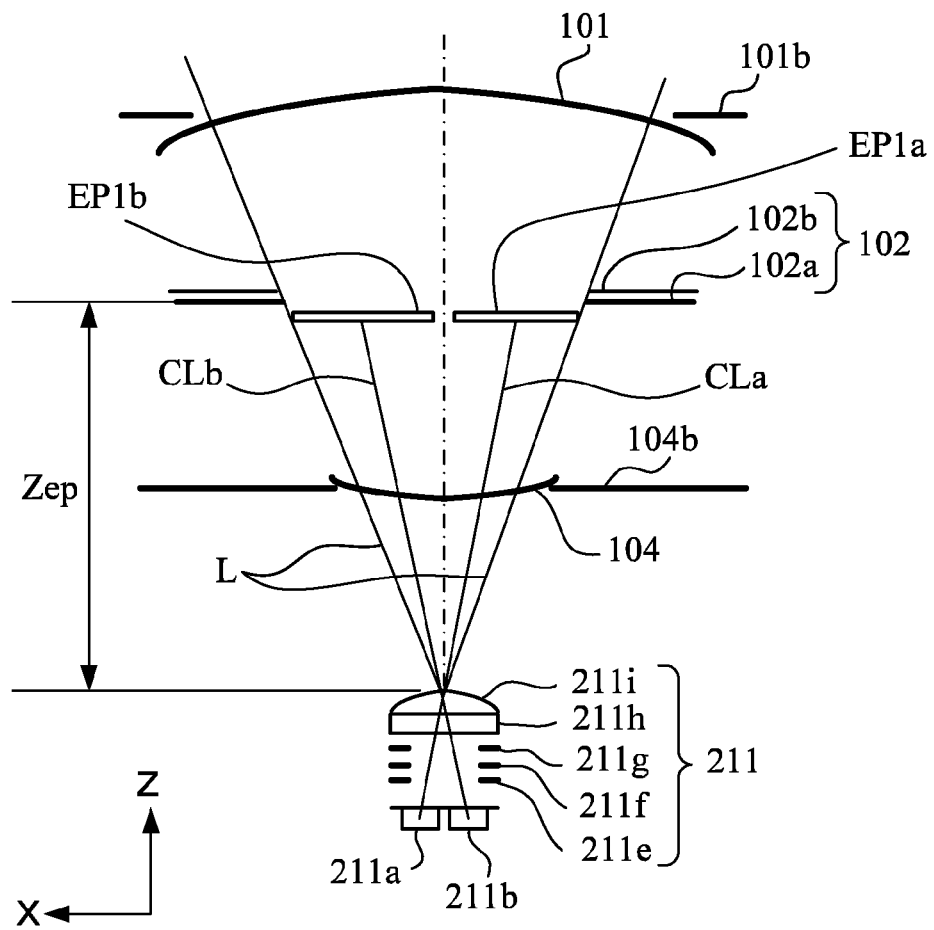
FIGS. 4A and 4B are views illustrating a relationship between a photoelectric converter in the image sensor and an exit pupil according to one embodiment of the present invention.
Figure 4B:
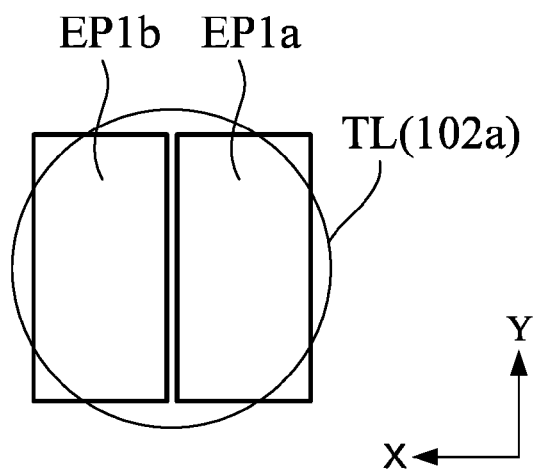

FIGS. 4A and 4B are views for explaining a conjugate relationship between an exit pupil plane in the imaging optical system and the photoelectric converter in the image sensor arranged at an image height of zero or near the center of the image plane, in the image pickup apparatus according to this embodiment. The photoelectric converter in the image sensor and the exit pupil plane in the imaging optical system are designed conjugate with each other by an on-chip micro lens. The exit pupil plane in the imaging optical system approximately coincides with a plane on which an iris diaphragm used to generally adjust the light quantity is placed. While the imaging optical system of this embodiment is a zoom lens with a magnification-varying function, the magnification-varying operation changes a size of the exit pupil and a distance between the exit pupil and the image plane depending on the optical type. FIGS. 4A and 4B illustrate the focal length of the lens unit 100 in the middle between a wide angle end and a telephoto end. A shape of the on-chip micro lens and the optimal design of a decenter parameter according to the image height (X, Y coordinates) are made by setting an exit pupil distance Zep in this state to a standard value.

In FIG. 4A, reference numeral 101 denotes the first lens unit, reference numeral 101b denotes a barrel unit configured to hold the first lens unit 101, reference numeral 104 denotes the focus lens, and reference numeral 104b denotes a barrel unit configured to hold the focus lens 104. Reference numeral 102 denotes the diaphragm, and reference numeral 102a denotes an openable plate that defines an aperture diameter when the diaphragm 102 is released. Reference numeral 102b denotes a diaphragm blade configured to adjust the aperture diameter when the diaphragm 102 is narrowed. The barrel member 101b, the openable plate 102a, the diaphragm blade 102b, and the barrel member 104b serve as a restriction member of a light flux that passes the imaging optical system and illustrate an optical virtual image observed from the image plane. A synthesized opening near the diaphragm 102 is defined as an exit pupil of a lens, and Zep is a distance from the image plane as described above.

The pixel 211 is arranged near the center on the image plane, and referred to as a central pixel in this embodiment. The central pixel 211 includes, in order from the bottom layer, photoelectric converters 211a and 211b, wiring layers 211e-211g, the color filter 211h, and the on-chip micro lens 211i. Two photoelectric converters are projected onto the exit pupil plane in the imaging optical system by the on-chip micro lens 211i. In other words, the exit pupil of the imaging optical system will be projected onto the surface of the photoelectric converter via the on-chip micro lens 211i.

FIG. 4B illustrates the projected image of the photoelectric converter on the exit pupil plane in the imaging optical system, and EP1a and EP1b are the projected images of the photoelectric converters 211a and 211b, respectively. According to this embodiment, the image sensor has pixels configured to obtain one of outputs from the two photoelectric converters 211a and 211b, and both outputs of them. The output of the sum of both outputs is made by photoelectrically converting light fluxes that have passed both areas of the projected images EP1a and EP1b as the overall pupil areas in the imaging optical system.

FIG. 4A illustrates an outermost light flux L that passes the imaging optical system. The light flux L is restricted by the openable plate 102a for the diaphragm 102, and the projected images EP1a and EP1b are little shielded in the imaging optical system. TL in FIG. 4B denotes the light flux L in FIG. 4A. Since most of the projected images EP1a and EP1b of the photoelectric converters are contained in a circle illustrated by TL, it is understood that the projected images EP1a and EP1b are little shielded in the imaging optical system. Since the light flux L is restricted only by the openable plate 102a in the diaphragm, TL is almost as large as the openable plate 102a in FIG. 4B. A light shield state of each projected image EP1a or EP1b at the center on the image plane is symmetrical with respect to the optical axis, and each of the photoelectric converters 211a and 211b receives an equal light quantity.

In the phase difference AF, the camera MPU 125 controls the sensor drive circuit 123 so as to read the above two types of outputs from the image sensor 122. The camera MPU 125 provides the information on the focus detecting area to the image processing circuit 124, and instructs it to generate data of the A and B images used for the AF based on the outputs from the pixels included in the focus detecting area, and to supply the data to the phase difference AF unit 129. The image processing circuit 124 generates the data of the A and B images used for the AF in accordance with this command, and outputs it to the phase difference AF unit 129. The image processing circuit 124 supplies RAW image data to the TVAF unit 130 again.

As described above, the image sensor 122 forms part of the focus detecting unit for each of the phase difference AF and the contrast AF.

While this embodiment describes the illustrative configuration that divides the exit pupil into two in the horizontal direction, the exit pupil may be divided into two in the vertical direction for part of the pixels in the image sensor. Alternatively, the exit pupil may be divided in each of the horizontal and vertical directions. The pixel configured to divide the exit pupil in the vertical direction can provide the phase difference AF that improves the vertical contrast of the object as well as the horizontal contrast.

Description of the Focus Detection Operation: Contrast AF

Figure 5:
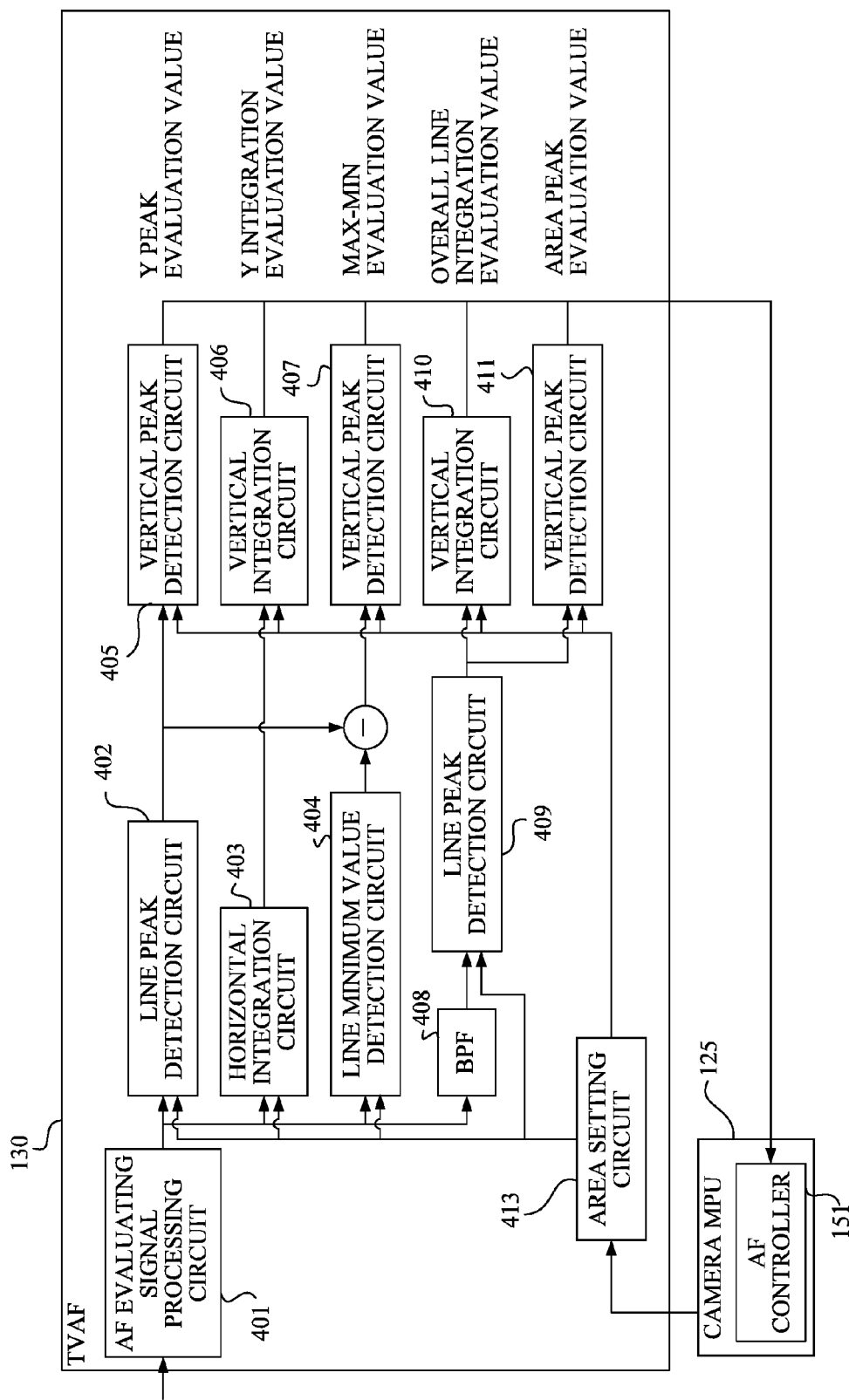
FIG. 5 is a view illustrating an illustrative configuration of a TVAF unit in the image pickup apparatus according to one embodiment of the present invention.

Referring now to FIG. 5, a description will be given of the contrast AF (TVAF). The contrast AF is realized when the camera MPU 125 and the TVAF unit 130 cooperatively and repetitively drive the focus lens and calculate the evaluation value.

If the RAW image data is input into the TVAF unit 130 from the image processing circuit 124, the AF evaluating signal processing circuit 401 performs the gamma correction processing configured to extract the green (G) signal from a Bayer arrangement signal, to emphasize the low-luminance component, and to suppress the high-luminance component. While this embodiment describes the TVAF with the green (G) signal, any one or more of the red (R) signal, the blue (B) signal, and the green (G) signal may be used. A luminance (Y) signal may be generated with all of the RGB colors. The output signal generated in the AF evaluating signal processing circuit 401 will be referred to as the luminance signal Y in the following description, irrespective of a type of the employed signal.

Assume that the camera MPU 125 sets the focus detecting area to an area setting circuit 413. The area setting circuit 413 generates a gate signal configured to select the signal in the set area. The gate signal is input into each of a line peak detection circuit 402, a horizontal integration circuit 403, a line minimum value detection circuit 404, a line peak detection circuit 409, vertical integration circuits 406 and 410, and vertical peak detection circuits 405, 407, and 411. The timing at which the luminance signal Y is input into each circuit is controlled so as to generate each focus evaluation value using the luminance signal Y in the focus detecting area. A plurality of areas can be set to the area setting circuit 413 in accordance with the focus detecting area.

A description will be given of a calculating method of the Y peak evaluation value. The gamma-corrected luminance signal Y is input into the line peak detection circuit 402 so as to calculate the Y line peak value for each horizontal line in the focus detecting area set in the area setting circuit 413. The vertical peak detection circuit 405 holds the peak of the output of the line peak detection circuit 402 in the vertical direction in the focus detecting area, and generates the Y peak evaluation value. The Y peak evaluation value is an index effective to the determination of the high-luminance object and the low-luminance object.

A description will be given of the calculating method of the Y integration evaluation value. The gamma-corrected luminance signal Y is input into the horizontal integration circuit 403 so as to calculate the integral value of Y for each horizontal line in the focus detecting area. The vertical integration circuit 406 integrates the output of horizontal integration circuit 403 in the vertical direction in the focus detecting area, and generates the Y integration evaluation value. The Y integration evaluation value can be used as an index used to determine the brightness in the entire focus detecting area.

A description will be given of a calculation method of a Max-Min evaluation value. The gamma-corrected luminance signal Y is input into the line peak detection circuit 402 so as to calculate the Y line peak value for each horizontal line in the focus detecting area. The gamma-corrected luminance signal Y is input into the line minimum value detection circuit 404 so as to detect the minimum value of Y for each horizontal line in the focus detecting area. The detected line peak value and minimum value of Y for each horizontal line are input into a subtractor, and the (line peak value-minimum value) is input into the vertical peak detection circuit 407. The vertical peak detection circuit 407 holds the peak in the vertical direction in the focus detecting area, and generates a Max-Min evaluation value. The Max-Min evaluation value is an index effective to the determination of the low contrast and the high contrast.

A description will be given of a calculation method of an area peak evaluation value. When the gamma-corrected luminance signal Y passes a BPF 408, a specific frequency component is extracted and a focus signal is generated. This focus signal is input into the line peak detection circuit 409 so as to calculate the line peak value for each horizontal line in the focus detecting area. The vertical peak detection circuit 411 holds the peak of the line peak value in the focus detecting area, and generates the area peak evaluation value. The area peak evaluation value changes little even if the object moves in the focus detecting area, and is an index effective to the restart determination of whether to shift to the focus-point search processing from the in-focus state.

A description will be given of the calculating method of the overall line integration evaluation value. The line peak detection circuit 409 calculates the line peak value for each horizontal line in the focus detecting area similar to the area peak evaluation value. Next, a line peak value is input into the vertical integration circuit 410 so as to integrate it in the vertical direction in the focus detecting area for all horizontal scanning lines and to generate the overall integration evaluation value. The high-frequency overall line integration evaluation value has a wide dynamic range and a high sensitivity due to the integration effect and sensitivity is high, and thus is a major AF evaluation value. Thus, a focus evaluation value when simply described means the overall line integration evaluation value in this embodiment.

The AF control unit 125$f$ in the camera MPU 125 acquires each focus evaluation value, and moves the focus lens 104 in a predetermined direction along the optical axis direction by the predetermined amount through the lens MPU 117. The AF control unit 125$f$ calculates a variety of evaluation values based on the newly obtained image data, and detects the focus lens position that maximizes the overall line integration evaluation value.

This embodiment calculates a variety of AF evaluation values in the horizontal line direction and in the vertical line direction. This configuration can provide a focus detection based on the contrast information of the object in two orthogonal or horizontal and vertical directions.

Description of the Focus Detecting Area

Figure 6A:
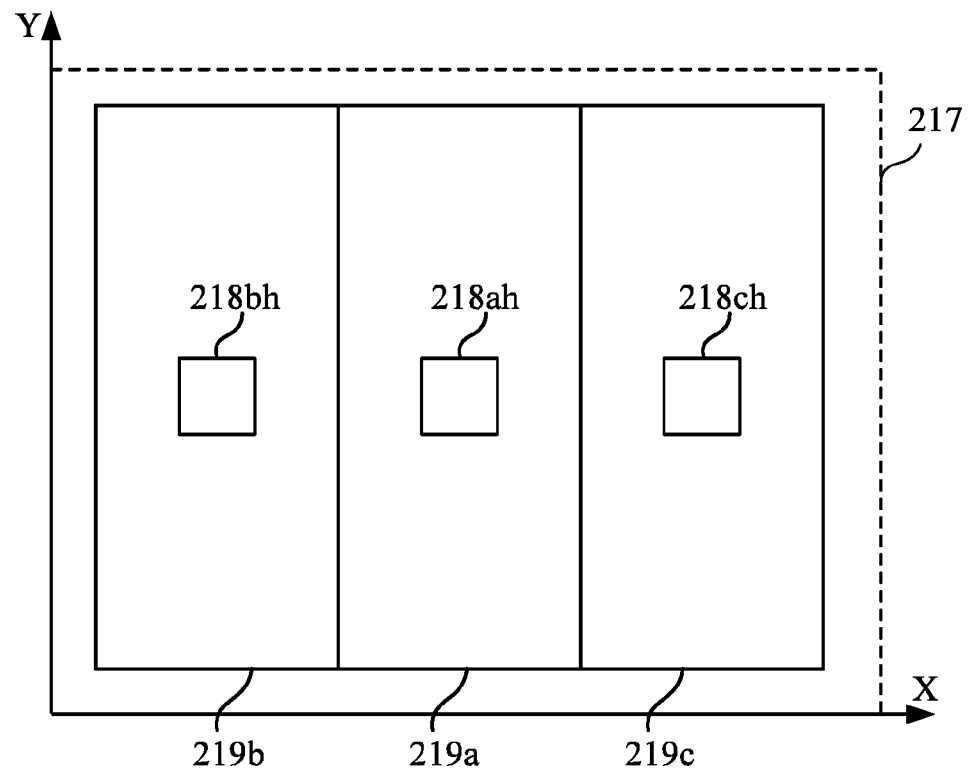
FIGS. 6A and 6B are views illustrating a setting example of a focus detecting area in a captured image according to one embodiment of the present invention.
Figure 6B:
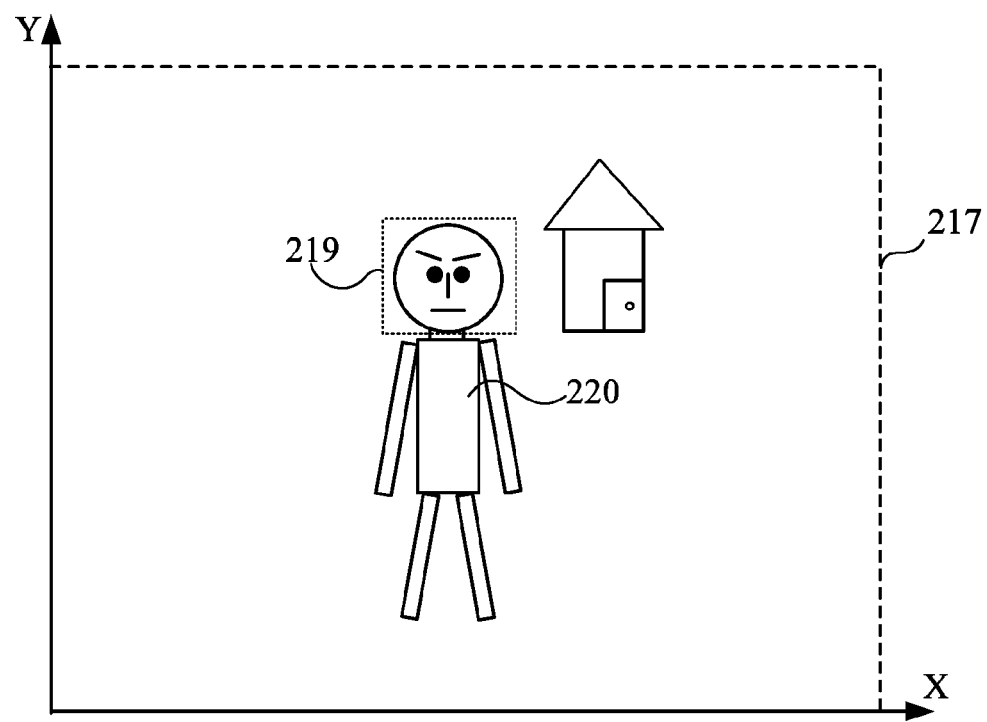

FIGS. 6A and 6B are views illustrating illustrative focus detecting areas in an image capturing area. As described above, any of the phase difference AF and the contrast AF can be performed based on the signal acquired from the pixel contained in the focus detecting area. In FIG. 6A, a dotted rectangle illustrates an image capturing area 217 having the pixels on the image sensor 122. The image capturing area 217 includes focus detecting areas 218$ah$, 218$bh$, and 218$ch$ for the phase difference AF. This embodiment sets totally three focus detecting areas 218$ah$, 218$bh$, and 218$ch$ for the phase difference AF at the center and on the left and right sides in the image capturing area 217. The TVAF focus detecting areas 219$a$, 219$b$, and 219$c$ are set so as to contain one of the focus detecting areas 218$ah$, 218$bh$, and 218$ch$ for the phase difference AF. FIGS. 6A and 6B illustrate the setting example of the focus detecting areas, and the present invention is not limited to the illustrated number, position, and size.

Description of the Flow of the Focus Detection Processing

Figure 1A:
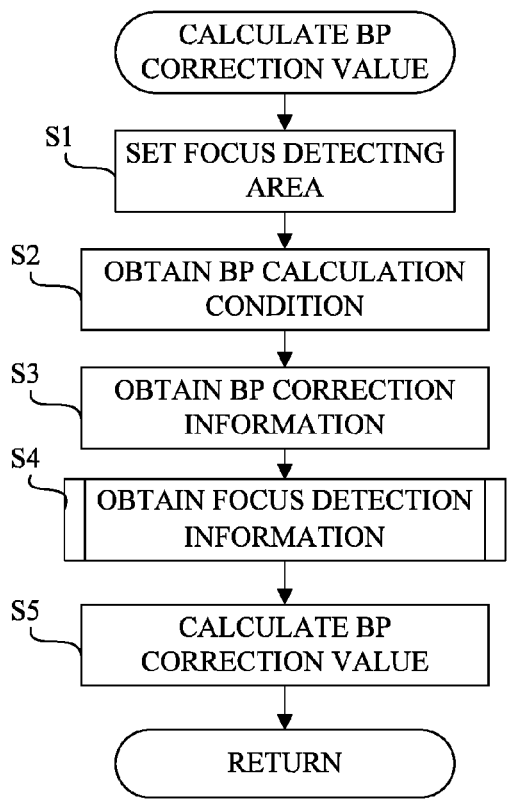
FIGS. 1A and 1B are flowcharts for explaining an automatic focus detection operation according to a first embodiment of the present invention.
Figure 1B:
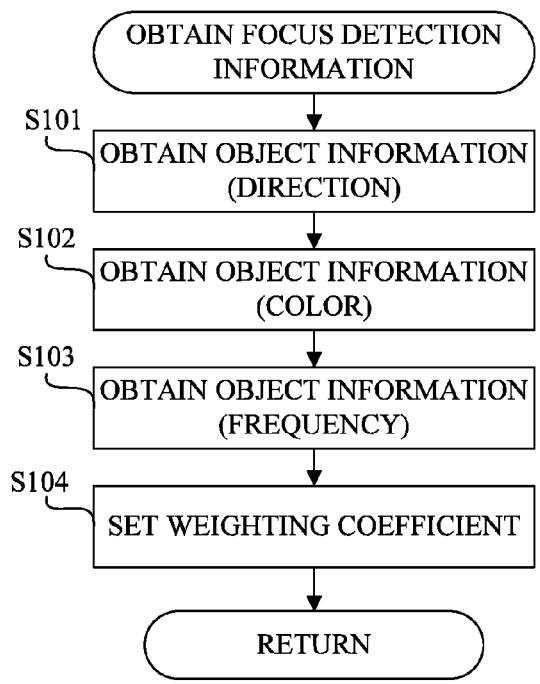

Referring now to FIGS. 1A and 1B, a description will be given of the autofocus (AF) operation in the digital camera according to this embodiment.

A detailed description will be given after the outline of the AF processing is described. The camera MPU 125 in this embodiment initially applies the phase difference AF or contrast AF, and calculates a defocus amount in the following focus detecting area and reliability of the defocus amount. When the defocus amount having predetermined reliability is obtained for all focus detecting areas, the camera MPU 125 moves the focus lens 104 to the closest focus position of the object based on the defocus amount. The camera MPU 125 moves the focus lens 104 in a direction based on a change of the focus evaluation value when it is determined that the object is located at a closer position.

After the focus detection ends with one of the methods, the camera MPU 125 calculates a variety of correction values, and corrects the focus detection result. The camera MPU 125 drives the focus lens 104 based on the corrected focus detection result.

A detailed description will now be given of the correction processing in the AF using the flowcharts illustrated in FIGS. 1A and 1B. Unless otherwise specified, the camera MPU 125 executes the following AF processing operation. When the camera MPU 125 transmits a command etc. to the lens MPU 117 so as to drive or control the lens unit 100, the camera MPU 125 may be considered to be an operating entity that provides controls for brief description purposes.

The camera MPU 125 sets the focus detecting area in the step S1. A set focus detecting area 219 may be a face area determined by a main object 220 as illustrated in FIG. 6B, or the previously set focus detecting area. This example sets a representative coordinate (x1, y1) in the focus detecting area 219. The representative coordinate (x1, y1) may be, for example, a center of gravity position to the focus detecting area 219.

In the step S2, the camera MPU 125 acquires a parameter (calculation condition) necessary to calculate the BP correction value. The BP correction value changes with a change of the imaging optical system and a change of the focus detection optical system, such as the position of the focus lens 104, the position of the first lens unit 101 representing the zoom state, and the coordinate (x1, y1) of the focus detecting area. Thus, the camera MPU 125 obtains the position of the focus lens 104, the position of the first lens unit 101 representing the zoom state, the coordinate (x1, y1) of the focus detecting area, etc., in the step S2.

Next, the BP correction information is acquired in the step S3. The BP correction information is information representing the aberration state of the optical system, such as the imaging position of the imaging optical system for each color, direction, and spatial frequency of the object. The BP correction information corresponds to the aberration information in this embodiment.

Referring now to FIGS. 11A and 11B, a description will be given of the illustrative spatial frequency BP correction information stored in the lens memory 118. FIG. 11A illustrates a defocus MTF (modulation transfer function) of the imaging optical system. The abscissa axis denotes the position of the focus lens 104, and the ordinate axis denotes the intensity of the MTF. Four types of curves in FIG. 11A are MTF curves for each spatial frequency, and the spatial frequency changes from the low frequency side to the high frequency side in order of MTF1, MTF2, MTF3, and MTF4. The MTF curve of the spatial frequency F1 (lp/mm) corresponds to MTF1, the MTF curve of the spatial frequency F2 (lp/mm) corresponds to MTF2, the MTF curve of the spatial frequency F3 (lp/mm) corresponds to MTF3, and the MTF curve of the spatial frequency F4 (lp/mm) corresponds to MTF4. LP4, LP5, LP6, and LP7 represent positions of the focus lens 104 corresponding to the maximum value of each defocus MTF curve.

FIG. 11B illustrates illustrative BP correction information in this embodiment. FIG. 11B illustrates a formula of information MTF_P_RH at the position of the focus lens 104 which provides the maximum value of the defocus MTF illustrated in FIG. 11A. The BP correction information, as used herein, is expressed for each of six types of combinations of the above colors and directions by the following expression with variables of the spatial frequency f and the position coordinate (x1, y1) of the focus detecting area on the image sensor.

$$MTF\_P\_RH(f,x,y)=(rh(0)\times x+rh(1)\times y+rh(2))\times f2+(rh(3)\times x+rh(4)\times y+rh(5))\times f+(rh(6)\times x+rh(7)\times y+rh(8)) \quad \text{Expression (1)}$$

While Expression (1) represents an expression of information MTF_P_RH at the position of the focus lens 104 representing the maximum value of the defocus MTF for each corresponding spatial frequency in the horizontal (H) direction for the red (R) signal, another combination is similarly expressed. This embodiment assumes that rh(n) (0≤n≤8) is previously stored in the lens memory 118 in the lens unit 100 and the camera MPU 125 acquires rh(n) (0≤n≤8) through the lens MPU 117. However, rh(n) (0≤n≤8) may be stored in a nonvolatile area in the camera RAM 125b.

The camera MPU 125 similarly stores and acquires coefficients (rv, gh, gv, bh, bv) in each of the combinations red and vertical (MTF_P_RV), green and horizontal (MTF_P_GH), green and vertical (MTF_P_GV), blue and horizontal (MTF_P_BH), and blue and vertical (MTF_P_BV). Thus, the BP correction information is expressed as a function, and a coefficient of each term is stored as the BP correction information. This configuration reduces a data amount of each of the lens memory 118 and the camera RAM 125b, and stores the BP correction information corresponding to a change of the imaging optical system and a change of the focus detection optical system.

Next, in the step S4, the focus detection information is acquired. FIG. 11D illustrates illustrative focus detection information. This focus detection information represents weighting magnitude information for each combination of a direction (horizontal (first direction), vertical (second direction)), a color (red (first color), green (second color), blue (third color)), and the spatial frequency of the contrast for evaluating the focus state. A detailed description will be given with reference to FIG. 1B.

Next, in the step S5, the camera MPU 125 calculates the BP correction information based on the weighting coefficient set by the focus detection information set in the step S4, and the BP correction value acquired in the step S3. The camera MPU 125 corrects the signal (focus detection result) according to the focus state of the imaging optical system using the calculated BP correction value. In other words, the camera MPU 125 corrects the focus detection result based on the BP correction information (aberration information) acquired in the step S3, the weighting coefficient (color information of the object, direction information (angular information) and weighting information acquired from the spatial frequency information) set in the step S4.

More specifically, the position information (x1, y1) of the focus detecting area in Expression (1) are initially substituted for x and y. Expression (1) is expressed in the form of the following expression (2).

$$MTF\_P\_RH(f)=Arh\times f2+Brh\times f+Crh \quad \text{Expression (2)}$$

The camera MPU 125 similarly calculates MTF_P_RV(f), MTF_P_GH(f), MTF_P_GV(f), MTF_P_BH(f), and MTF_P_BV (f).

FIG. 11B illustrates illustrative BP correction information after the position information in the focus detecting area in the step S1 is substituted, where the abscissa axis denotes the spatial frequency, and the ordinate axis denotes the position (peak position) of the focus lens 104 representing the maximum value of the defocus MTF. As illustrated, when an amount of the chromatic aberration is large, a curve for each color deviates, and when a difference between the horizontal direction and the vertical direction is large, the horizontal curve deviates from the vertical curve. Thus, this embodiment has defocus MTF information corresponding to the spatial frequency for each combination of the color (RGB) and the evaluation direction (H and V).

Next, the camera MPU 125 weights the BP correction information with a coefficient (FIG. 11D) which constitutes the focus detection information acquired in the step S4. This configuration weights the setting information with respect to the color and direction with which the focus detection and image capturing are evaluated. More specifically, the camera MPU 125 calculates a spatial frequency characteristic MTF_P_AF for the focus detection, and a spatial frequency characteristic MTF_P_IMG(f) for the captured image (f) using Expressions (3) and (4).

$$MTF\_P\_AF(f)=$$
$$K\_AF\_R \times K\_AF\_H \times MTF\_P\_RH(f)$$
$$+K\_AF\_R \times K\_AF\_V \times MTF\_P\_RV(f)$$
$$+K\_AF\_G \times K\_AF\_H \times MTF\_P\_GH(f)$$
$$+K\_AF\_G \times K\_AF\_V \times MTF\_P\_GV(f)$$
$$+K\_AF\_B \times K\_AF\_H \times MTF\_P\_BH(f)$$
$$+K\_AF\_B \times K\_AF\_V \times MTF\_P\_BV(f) \quad \text{Expression (3)}$$

$$MTF\_P\_IMG(f)=$$
$$K\_IMG\_R \times K\_IMG\_H \times MTF\_P\_RH(f)$$
$$+K\_IMG\_R \times K\_IMG\_V \times MTF\_P\_RV(f)$$
$$+K\_IMG\_G \times K\_IMG\_H \times MTF\_P\_GH(f)$$
$$+K\_IMG\_G \times K\_IMG\_V \times MTF\_P\_GV(f)$$
$$+K\_IMG\_B \times K\_IMG\_H \times MTF\_P\_BH(f)$$
$$+K\_IMG\_B \times K\_IMG\_V \times MTF\_P\_BV(f) \quad \text{Expression (4)}$$

FIG. 11C illustrates a focus lens position (peak position) that provides a peak (maximum value) of a defocus MTF obtained by substituting discrete spatial frequencies F1 to F4 for Expression (3), for example, in the ordinate axis.

Next, the camera MPU 125 calculates the in-focus position (P_img) of the captured image and the in-focus position (P_AF) detected by the AF using the following Expressions (5) and (6), the defocus MTF information MTF_P(n) obtained in the step S3, and the evaluation bands K_IMG_fq and K_AF_fq obtained in the step S4.

$$P\_img=MTF\_P\_IMG(1) \times K\_IMG\_FQ(1)+$$
$$MTF\_P\_IMG(2) \times K\_IMG\_FQ(2)+MTF\_P\_IMG$$
$$(3) \times K\_IMG\_FQ(3)+MTF\_P\_IMG(4) \times$$
$$K\_IMG\_FQ(4) \quad \text{Expression (5)}$$

$$P\_AF=MTF\_P\_AF(1) \times K\_AF\_FQ(1)+MTF\_P\_AF$$
$$(2) \times K\_AF\_FQ(2)+MTF\_P\_AF(3) \times K\_AF\_FQ$$
$$(3)+MTF\_P\_AF(4) \times K\_AF\_FQ(4) \quad \text{Expression (6)}$$

In other words, the camera MPU 125 performs a weighting addition for the maximum value information K_IMG_fq and K_AF_fq of the defocus MTF for each spatial frequency illustrated in FIG. 11C, with the captured image and AF evaluation bands K_IMG_FQ and K_AF_FQ calculated in the step S4. This configuration calculates the in-focus position (P_img) for the captured image, and the in-focus position (P_AF) detected by the AF.

Next, the camera MPU 125 calculates the BP correction value (BP) by the following Expression (7).

$$BP=P\_AF-P\_img \quad \text{Expression (7)}$$

This embodiment executes processing to the position of the focus detecting area and a color and a contrast direction of an evaluation signal prior to processing to the evaluation band. In other words, this embodiment performs a calculation using the weighting coefficient based on the aberration information of the imaging optical system and the color information of the object and the weighting coefficient based on the direction information (angular information) prior to the calculation using the weighting coefficient based on the aberration information and the spatial frequency information. This is because when the photographer determines the position of the focus detecting area through the setting, information on the position of the focus detecting area and the evaluated color and direction to be evaluated is less likely to be changed. On the other hand, the evaluation band of the signal is likely to be changed by the read mode of the image sensor, the digital filter of the AF evaluation signal, etc., as described later with reference to FIGS. 13A to 13F. For example, it is conceivable that the band of the digital filter is changed to a lower band in the low-luminance environment where the S/N ratio of the signal drops. In such a case, this embodiment calculates and then stores a (peak) coefficient that is less likely to change, calculates only a coefficient (evaluation band) that is highly likely to change, if necessary, and calculates the BP correction value. This configuration can reduce the calculation load, when the photographer has set the position of the focus detecting area.

Referring now to FIG. 1B, a detailed description will be given of an acquiring method of the focus detection information illustrated in FIG. 11D. The camera MPU 125 executes the steps S101, S102, and S103, and constitutes the object information detector in this embodiment.

Acquisition of Direction Information

Initially, in the step S101, the camera MPU 125 obtains the direction information (angular information) of the object, and sets the weighting coefficients K_AF_H, K_AF_V, K_IMG_H, and K_IMG_V in the directions illustrated in FIG. 11D. For example, assume that there is an edge illustrated in FIG. 12A in the focus detecting area set in the step S1. Where θ is an edge direction of the shaded object illustrated in FIG. 12A to be captured, and K_AF_H, K_AF_V, K_IMG_H, and K_IMG_V depend on θ. As long as θ is detected by the known object recognition technology, the detecting method of θ is not particularly limited. One example will be described with reference to FIG. 12B.

This example intends to produce a dispersion (histogram) of the edge angle of the object in the detecting area. A slope direction θ in each pixel position coordinate (x, y) is computed, for example, by the following Expression (8).

$$\theta(x,y)=\tan^{-1}(V(x,y)/H(x,y)) \quad \text{Expression (8)}$$

Figure 12A:
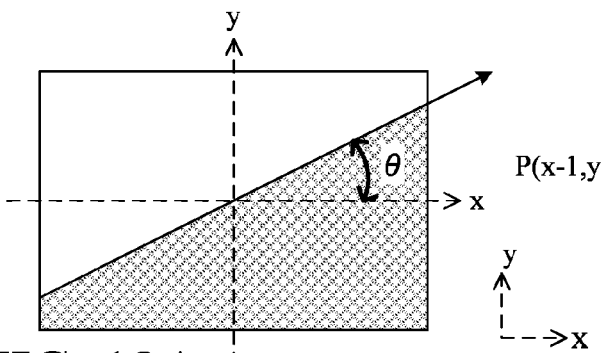
FIGS. 12A, 12B, 12C, 12D, and 12E are views for explaining an acquisition of angular information of an object according to one embodiment of the present invention.
Figure 12B:
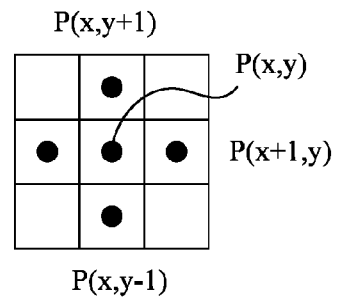

The coordinate (x, y) of the pixel position is defined by the Cartesian coordinate in which the horizontal right direction and the vertical upper direction are set positive, as illustrated in FIG. 12A. H(x, y) represents the horizontal contrast intensity of the specific frequency at the coordinate (x, y), as expressed by the following Expression (9). P(α, β) represents a luminance value at the pixel position (α, β). FIG. 12B is a correspondence view of each coordinate when it is expanded to the pixel level.

$$H(x,y)=P(x+1,y)-P(x-1,y) \quad \text{Expression (9)}$$

Similarly, V(x, y) represents the vertical contrast intensity at the coordinate P (x, y), as expressed by the following Expression (10).

$$V(x,y)=P(x,y+1)-P(x,y-1)$$ Expression (10)

While this embodiment sets a detection filter used to calculate the contrast intensity of H(x, y) and V(x, y) to (1, 0, −1), the present invention is not limited to this embodiment as long as the frequency component of the object is detectable.

Figure 12C:
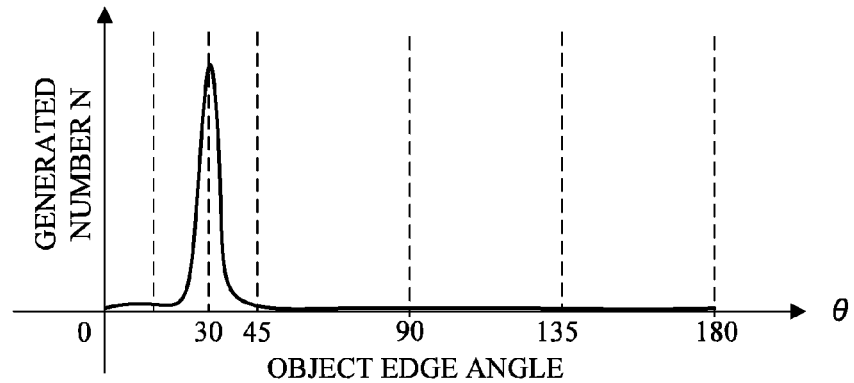

Herein, θ(x, y) is calculated for each pixel position coordinate (x, y) and an occurrence frequency histogram is created, as illustrated in FIG. 12C. For example, an edge angle of the object is defined as an object angle θ that most frequently occurs. In the example of FIG. 12C, θ=30°. When θ of 30° is detected, values of K_AF_H, K_AF_V, K_IMG_H, and K_IMG_V may be set as follows by taking the angle of the object into consideration.

$$K\_AF\_H=\cos{^2\theta}$$

$$K\_AF\_V=\sin{^2\theta}$$

$$K\_IMG\_H=\cos{^2\theta}$$

$$K\_IMG\_V=\sin{^2\theta}$$ Expression (11)

Figure 12D:
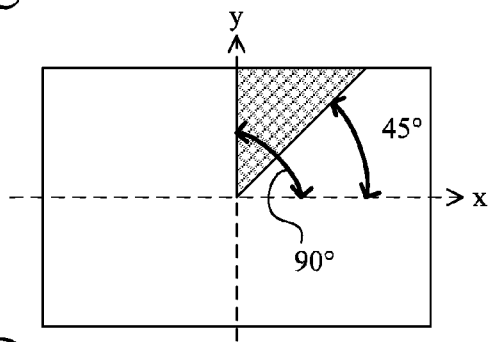
Figure 12E:
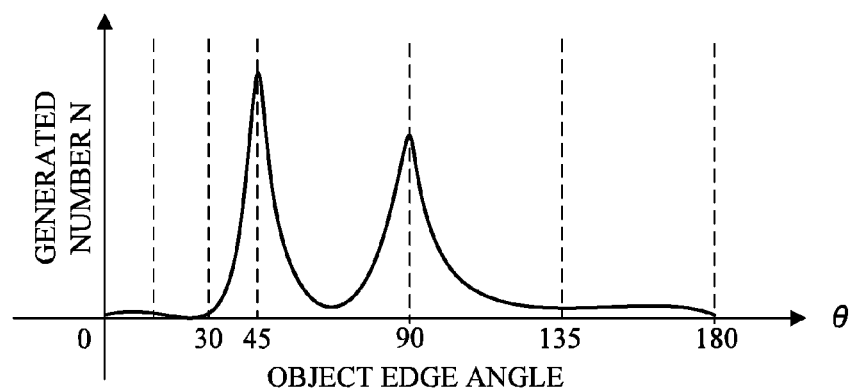

When many θs are detected as illustrated in FIG. 12E for an object illustrated in FIG. 12D, the object angle θ may be set to an average value of θ1=45° and θ2=90° or to a value that more frequently occurs or θ having the highest contrast by considering the luminance distribution of the object.

Thus, after the edge angle of the object (direction information, angular information) is obtained, the camera MPU 125 sets a weighting coefficient (the second weighting coefficient) corresponding to the horizontal direction H (first direction) and the vertical direction V (second direction orthogonal to the first direction) based on the edge angle.

This example relies on the horizontal direction H and the vertical direction V. However, the directions are not limited to these two directions and weighting coefficients K_AF(θ) and K_IMG(θ) for each object angle θ may be set, as long as the BP correction information (=aberration information) acquired in the step S3 is information corresponding to two or more angles. The set direction is not limited to the horizontal direction H or the vertical direction V and may be a weighted ratio between the meridional and sagittal directions.

Acquisition of the Color Information

Next, in the step S102, weighting coefficients K_AF_R, K_AF_G, K_AF_B, K_IMG_R, K_IMG_G, and K_IMG_B for the colors are set up.

This embodiment acquires the color information of the object and sets the weighting coefficients K_AF_R, K_AF_G, K_AF_B, K_IMG_R, K_IMG_G, and K_IMG_B for the colors as illustrated in FIG. 11D. For example, it is conceivable to change the weighting coefficient for the color using the well-known technology and the information on the auto-exposure (AE hereinafter) function. The weighting coefficient for the color can be changed by the luminance distribution information of the sensor. Thus, after the color information of the object is acquired, the camera MPU 125 sets the weighting coefficient (the first weighting coefficient) based on the red (the first color), the green (the second color), and the blue (the third color) corresponding to the color information. This example uses weighting ratios for each of R, G, and B, weighting coefficients K_AF(w) and K_IMG(w) may be set for each object color as long as the BP correction information (=aberration information) acquired in the step S3 is information corresponding to a plurality of chromatic wavelengths.

Acquisition of the Frequency Information

Next, in the step S103, the camera MPU 125 sets weighting coefficients K_AF_fq(n) and K_IMG_fq(n) of the spatial frequency. The precision improves as n increases, but n is an arbitrary set number.

Referring now to FIGS. 13A to 13F, a description will be given of a calculation of the AF evaluation band (second evaluation band) and a captured image evaluation band (first evaluation band) in the step S103. FIGS. 13A to 13F illustrate the intensity for each spatial frequency, where the abscissa axis denotes the spatial frequency and the ordinate axis denotes the intensity.

Figure 13A:
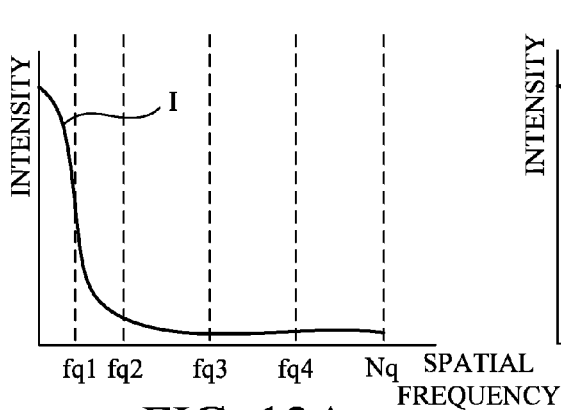
FIGS. 13A, 13B, 13C, 13D, 13E, and 13F are views for explaining an acquisition of frequency information of an object according to one embodiment of the present invention.

FIG. 13A illustrates an illustrative spatial frequency characteristic (I) of the object, where fq1, fq2, fq3, and fq4 on the abscissa axis are spatial frequencies set in FIG. 11D. Nq represents the Nyquist frequency determined by the pixel pitch of in the image sensor. FIGS. 13B to 13F, which will be described later, also illustrate fq1 to fq4 and Nq. In the first embodiment, the spatial frequency characteristic (I) of the object changes the used spatial frequency characteristic of the object according to the object for which the focus detection is performed. The spatial frequency information of the object can be obtained as illustrated in FIG. 13A by performing processing, such as the FFT processing, for a captured image signal with the focus detecting area set in the step S1. This processing increases the calculation load, but can calculate the correction amount for the object to be focus-detected and provide highly precise focusing. For simple description purposes, some previously stored types of spatial frequency characteristics may be properly used depending on the contrast information of the object.

Figure 13D:
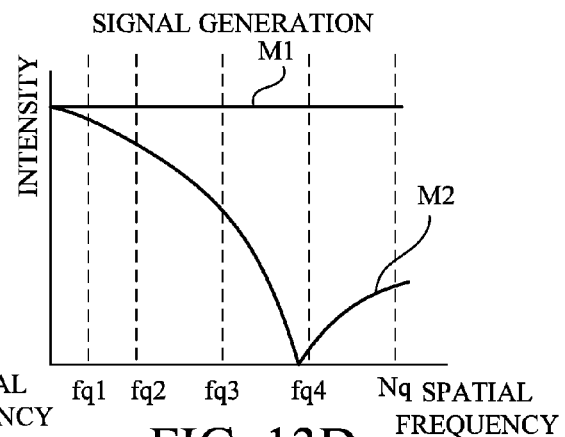
Figure 13B:
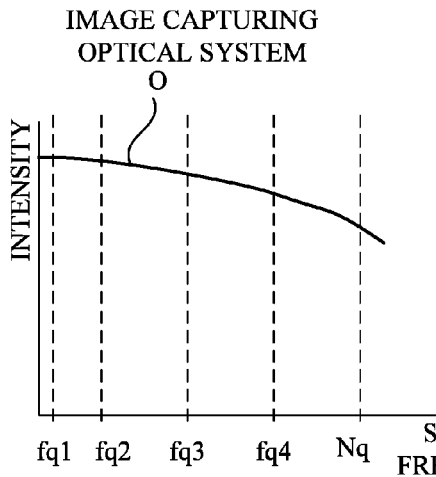

FIG. 13B illustrates a spatial frequency characteristic (O) of the imaging optical system. This optical information may be acquired through the lens MPU 117, and stored in the RAM 125b in the camera. The stored information may be spatial frequency characteristic for each defocus state or the spatial frequency characteristic in the in-focus state. Since the spatial frequency BP correction value is calculated near the in-focus position, the spatial frequency characteristic in the in-focus state provides a highly precise correction. While the calculation load increases, the spatial frequency characteristic for each defocus state can provide more precise focusing.

FIG. 13B illustrates the spatial frequency characteristic (O) of the imaging optical system as a curve, but it has discrete values corresponding to the spatial frequencies fq1, fq2, fq3, and fq4 and is expressed as O(n) (1≤n≤4).

Figure 13E:
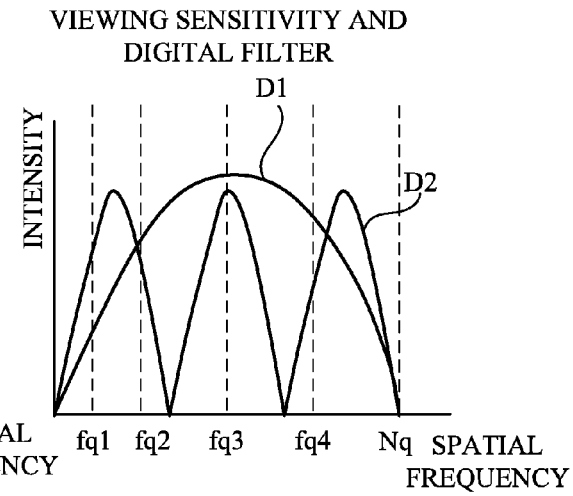
Figure 13C:
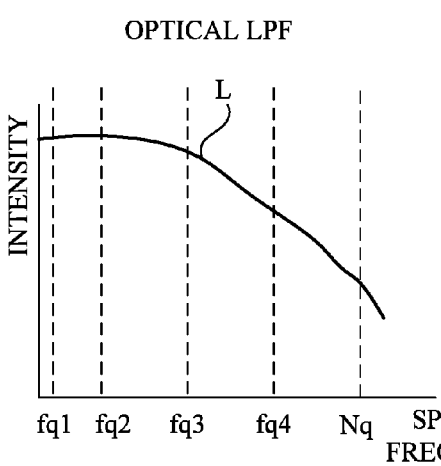

FIG. 13C illustrates a spatial frequency characteristic (L) of the optical low-pass filter 121. This information is stored in the RAM 125b in the camera. FIG. 13C illustrates the spatial frequency characteristic (L) of the optical low-pass filter 121 as a curve, but it has discrete values corresponding to the spatial frequencies fq1, fq2, fq3, and fq4 and is expressed as L(n) and (1≤n≤4).

FIG. 13D illustrates spatial frequency characteristics (M1, M2) in generating signals. As described above, the image sensor according to the first embodiment has two types of read modes. A spatial frequency characteristic does not change in generating a signal in the first read mode or the overall pixel read mode. M1 in FIG. 13D denotes the spatial frequency characteristic in the first read mode. On the other hand, a spatial frequency characteristic changes in generating a signal in the second read mode or the thinning read mode. As described above, the low-pass effect through an addition occurs when the signal is added in thinning the signal in the X direction and the S/N ratio improves. M2 in FIG. 13D denotes the spatial frequency characteristic in generating the signal in the second read mode, illustrating the low-pass effect through an addition without considering the thinning influence.

While FIG. 13D illustrates the spatial frequency characteristics (M1, M2) in generating signals as curves, they have discrete values corresponding to the spatial frequencies fq1, fq2, fq3, and fq4 and are expressed as M1($n$), M2($n$) (1≤n≤4).

FIG. 13E illustrates a spatial frequency characteristic (D1) representing the sensitivity for each spatial frequency when the captured image is viewed, and a spatial frequency characteristic (D2) of a digital filter used to process the AF evaluation signal. The sensitivity for each spatial frequency in appreciating the captured image is affected by the viewing environment, such as a viewer's individual difference, an image size, a viewing distance, and the brightness. The first embodiment sets the sensitivity for each spatial frequency in the viewing and stores it as a representative value.

On the other hand, in the second read mode, the aliasing noise of the frequency component of the signal occurs due to the thinning influence. D2 denotes the spatial frequency characteristic of the digital filter when the influence is considered.

While FIG. 13E illustrates the spatial frequency characteristic (D1) in the viewing and the spatial frequency characteristic (D2) in the digital filter as curves, they have discrete values corresponding to the spatial frequencies fq1, fq2, fq3, and fq4, and are expressed as D1($n$), D2($n$) (1≤n≤4).

As mentioned above, the evaluation band K_IMG_fq and the AF evaluation band K_AF_fq of the captured image are calculated by storing various information either in the camera or in the lens using the following expressions.

$$K\_IMG\_fq(n)=I(n)\times O(n)\times L(n)\times M1(n)\times D1(n)(1\le b\le 4) \quad \text{Expression}(12)$$

$$K\_AF\_fq(n)=I(n)\times O(n)\times L(n)\times M2(n)\times D2(n)(1\le n\le 4) \quad \text{Expression (13)}$$

Figure 13F:
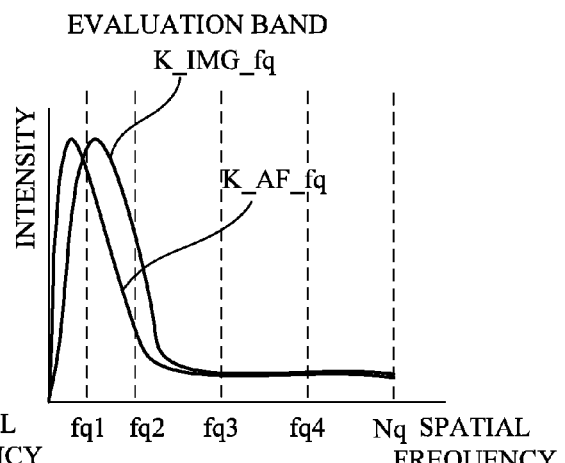

FIG. 13F illustrates the evaluation band K_IMG_fq and the AF evaluation band K_AF_fq of the captured image. The calculation, such as Expressions (12) and (13), quantifies the influence on the factor that determines the focus state of the captured image for each spatial frequency. Similarly, the influence of the error of the focus detection result can be quantified for each spatial frequency. The evaluation band K_IMG_fq and the AF evaluation band K_AF_fq corresponding to the spatial frequency characteristic of the object can be obtained by updating the spatial frequency characteristic (I) in FIG. 13A for each detected object.

It is unnecessary to finish all calculations in advance. For example, only the spatial frequency characteristics of the imaging optical system and the object may be previously calculated and stored in the camera so as to reduce a storage capacity of the data and a calculation amount.

Thus, after the spatial frequency information, such as the spatial frequency information of the object, is acquired, the camera MPU 125 sets (or calculates) a weighting coefficient (the third weighting coefficient) based on the spatial frequency information.

FIGS. 13A to 13F illustrates the four spatial frequencies fq1 to fq4 for simple description purposes. However, as the number of spatial frequency characteristics of the data increases, the correction value can be more precisely calculated because the spatial frequency characteristics of the captured image and the AF evaluation band can be reproduced with better resolutions. On the other hands, a calculation load can be reduced by lessening the number of weighting spatial frequencies. The following calculation may be performed with the spatial frequencies representing the spatial frequency characteristics of the evaluation band and the AF evaluation band of the captured image.

After the camera MPU 125 obtains the object information on the direction, color, and frequency in the steps S101 to S103, the camera MPU 125 sets a weighting coefficient in the step S104. Herein, the calculated weighting coefficient is stored in the form of FIG. 11D.

This embodiment obtains object information on all of the direction, color, and frequency, but may use a fixed value for one of the weighting coefficients of the direction, color, and frequency so as to reduce the calculation load.

For example, the directional weighting coefficients K_AF_H, K_AF_V, K_IMG_H, and K_IMG_V may be set as follows when the focus detection direction is the horizontal H direction in a pupil division shape illustrated in FIG. 4B:

$$K\_AF\_H=1$$

$$K\_AF\_V=0$$

$$K\_IMG\_H=1$$

$$K\_IMG\_V=1$$

This is because the focus position obtained by the focus detection is likely to affect the aberration in the horizontal direction H and the focus position of the captured image is generally set based on the aberration state that is made by averaging a value in the horizontal direction H and a value in the vertical direction V with a ratio of 1:1.

The chromatic weighting coefficients K_AF_R, K_AF_G, K_AF_B, K_IMG_R, K_IMG_G, and K_IMG_B are previously set, for example, when a focus detecting pixel is a G pixel in the Bayer arrangement as follows.

$$K\_AF\_R=0$$

$$K\_AF\_G=1$$

$$K\_AF\_B=0$$

$$K\_IMG\_R=0.3$$

$$K\_IMG\_G=0.5$$

$$K\_IMG\_B=0.2$$

This is because only the chromatic aberration of G affects the focus position, and the focus position of the captured image fluctuates due to a chromatic aberration of each color weighted by the desired white balance coefficient.

The weighting coefficient of the spatial frequency may be set to the evaluation band K_IMG_fq(n) and the AF evaluation band K_AF_fq(n) calculated by providing the representative object and by setting the spatial frequency characteristic (I) of the object illustrated in FIG. 13A to a fixed value.

Second Embodiment

A description will now be given of a second embodiment of the present invention. The major difference between this embodiment and the first embodiment is that this embodiment provides determinations for reducing the calculation loads of the focus detection information and the BP correction value.

Before calculating the BP correction value, the second embodiment determines whether the focus state is to be detected and whether the correction value is to be calculated based on the previously acquired BP correction information (aberration information). Therefore, in this embodiment, the camera MPU 125 serves as a determination unit configured to determine, based on the BP correction information (aberration information), whether the focus detection information is to be obtained and whether the BP correction value is to be calculated. This embodiment can reduce the calculation load because a finally calculated correction amount is small depending on a lens, an individual unit, a lens state, etc., and a correction value may not be calculated in some conditions.

This embodiment also utilizes the block diagram of the image pickup apparatus (FIG. 2), the explanatory views of each focus detection method (FIGS. 3A to 5), the explanatory view of the focus detecting area (FIGS. 6A and 6B), and the focus detection processing and the flowcharts of various focus detection information acquisition (FIGS. 1B, 12, and 13).

Referring now to FIGS. 7A, 7B, and 7C, a description will be given of a correction value calculating method according to this embodiment.

A series of operations from the step S1 to the step S5 in this embodiment are the same as those in the first embodiment, and a description thereof will be omitted.

One of the differences between this embodiment and the first embodiment is an acquiring method of the focus detection information in the step S11.

In the step S11, the camera MPU 125 determines, based on the BP correction information (aberration information) acquired in the step S3, whether it is necessary to obtain the direction, color, and frequency information in the step S4 and to calculate the BP correction value in the step S5, in the subsequent stages.

Referring now to FIG. 7B, a detailed description will be given of a concrete determination method.

The BP correction information acquired in the step S3 is expressed in the form of that illustrated in FIG. 11B, for example, as described above. At this time, a curve MTF_P at a defMTF peak position to the spatial frequency for each color and direction has a smaller aberration and the correction value calculated in the subsequent stage becomes smaller as the overlap increases. This embodiment determines the aberrational amount for each aberrational factor based on the BP correction information acquired in the step S3, and judges whether the object information is to be acquired. Assume that determination flags Fg_C, Fg_D, and Fg_Fq used to determine the aberrations in the color, direction, and frequency are previously stored as illustrated in FIG. 7C for a lens having the BP correction information (aberration information) illustrated in FIG. 11B. Reference numeral 1 means a large aberration amount, and reference numeral 0 means a small aberration amount. This determination flag may be obtained through a calculation.

The calculation may use the following determination method, for example.

First, in calculating Fg_D, the camera MPU 125 sets the color to G and the frequency to Fq3 so as to fix a component other than the required flag parameter in the color, direction, and the frequency. The fixed parameter may be set to a representative value that may be a generally distributing direction, color wavelength, and spatial frequency.

Next, the camera MPU 125 sets a threshold DIF_K1, and detects a maximum value P_MAX (LP6_GH in FIG. 11B) and a minimum value P_MIN (LP6_GV in FIG. 11B) at the peak position in the BP correction information and use them for the determination with Expression (14).

$$|P\_MAX - P\_MIN| \geq DIF\_K1 \qquad \text{Expression (14)}$$

DIF_K1 is a preset value. The flag becomes 1 when Expression (14) is satisfied, whereas the flag becomes 0 when Expression (14) is not satisfied.

Similarly, the determinations with Fg_C and Fg_Fq will provide a flag illustrated in FIG. 7C to the BP correction information (aberration information) acquired in the step S3.

In the step S201, the camera MPU 125 determines whether an aberrational amount of the astigmatism is large or small. When the above determination flag of Fg_D is 1, the flow moves to the step S101, and when it is 0 (when it is determined that an amount of the astigmatism in the aberration information is smaller than a predetermined value), the flow moves to the step S202 due to a small amount of aberration. The acquiring method of the direction information in the step S101 is the same as that of the first embodiment and thus a description thereof will be omitted. When the aberration amount is small, it is not determined that the direction information (angular information) is to be obtained. The calculation load can be reduced by omitting the processing in the step S101. In the example illustrated in FIG. 7C, FgD=1 and the flow moves to the step S101 so as to acquire the direction information.

Next, in the step S202, the camera MPU 125 determines whether an amount of the chromatic aberration is large or small. When the above determination flag of Fg_C is 1, the flow moves to the step S102, and when it is 0 (when it is determined that an amount of the chromatic aberration in the aberration information is smaller than a predetermined value), the flow moves to the step S203 due to a small aberrational amount. The acquiring method of the color information in the step S102 is the same as that of the first embodiment and thus a description thereof will be omitted. When the aberration amount is small, it is not determined that the color information is to be obtained. The calculation load can be reduced by omitting the processing in the step S102. In the example illustrated in FIG. 7C, Fg_C=0 and the flow moves to the step S203.

Next, in Step S203, the camera MPU 125 determines whether an amount of the spherical aberration is large or small. When the above determination flag of Fg_Fq is 1, the flow moves to the step S103, and when it is 0 (when it is determined that an amount of the spherical aberration in the aberration information is smaller than a predetermined value), the focus detection information acquiring action ends due to a small aberrational amount. The acquiring method of the spatial frequency information in the step S103 is the same as that of the first embodiment and thus a description thereof will be omitted. When the aberrational amount is small, it is not determined that the spatial frequency information is to be obtained. The calculation load can be reduced by omitting the processing in the step S103. In the example illustrated in FIG. 7C, Fg_Fq=1 and the frequency information is obtained.

Similar to the first embodiment, the weighting coefficient K is set in the step S104, and the correction coefficient that is not acquired may be set to 1 when Fg=0.

Thus, before calculating the BP correction value, this embodiment predicts the magnitude of the correction value based on the previously acquired BP correction information (aberration information), and determines whether the BP correction information (aberration information) is large or small. This method can reduce a calculation load of the correction value for a lens with a small BP correction value in the lens interchangeable type system. Whether the general correction is necessary for a camera having a different setting can be determined by storing the aberration information instead of the BP correction value of the combination of the camera and the lens.

While this embodiment uses the information on the def-MTF peak position (focus lens position that provides a peak of the defocus MTF), the aberration information of the imaging optical system is not limited to this embodiment. For example, a correction value may be calculated using the defocus MTF information.

Third Embodiment

A description will now be given of a third embodiment according to the present invention. This embodiment is also different from the first embodiment in that this embodiment provides the determination for reducing the calculation load of the BP correction value. Moreover, this embodiment is different from the second embodiment in that this embodiment provides the determination based on the focus detection information.

This embodiment also utilizes the block diagram of the image pickup apparatus (FIG. 2), the explanatory views of each focus detection method (FIGS. 3A to 5), the explanatory view of the focus detecting area (FIGS. 6A and 6B), and the focus detection processing and the flowcharts of various focus detection information acquisition (FIGS. 1B, 12, and 13).

Figure 8:
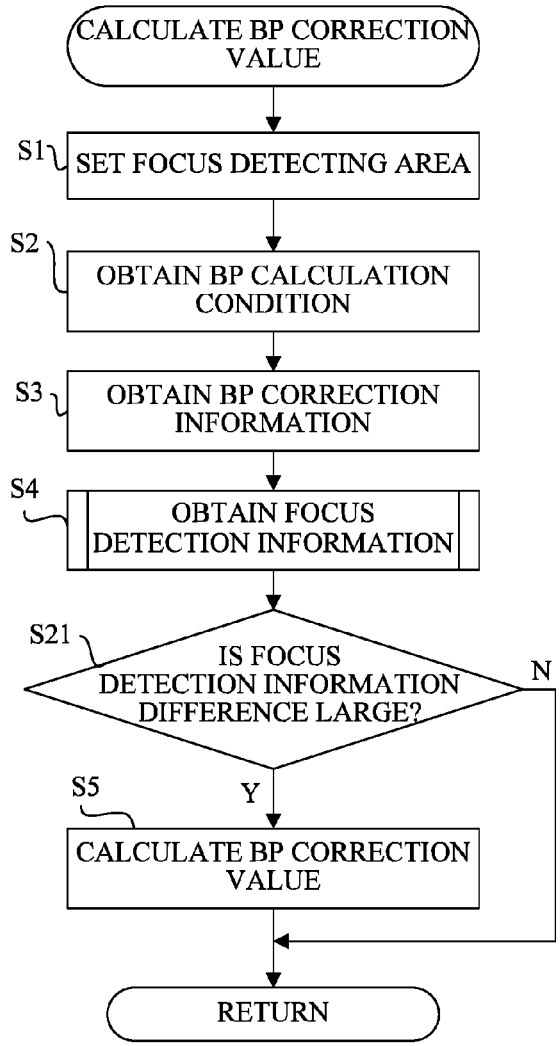
FIG. 8 is a flowchart for explaining an automatic focus detection operation according to a third embodiment of the present invention.

Referring now to FIG. 8, a description will be given of a correction value calculating method according to this embodiment.

A series of operations from the step S1 to the step S4 are the same as those in the first embodiment, and a description thereof will be omitted. The processing in the step S4 may be replaced with the processing in the step S11 described in the second embodiment.

In the step S21, the camera MPU 125 determines, based on the focus detection information acquired in the step S4, whether it is necessary to calculate the BP correction value in the step S5 in the subsequent stage. Thus, the camera MPU 125 in this embodiment serves as a determination unit configured to determine, based on the focus detection information (weighting information) acquired in the step S4, whether the BP correction value is to be calculated.

A more specific determining method will now be described in detail below. The focus detection information acquired in the step S4 is in the form illustrated in FIG. 11D, for example, as described above. The calculated BP correction value is smaller as the weighting coefficients K_AF_X and K_IMG_X (X=H or V/R or G or B/fq(n)) are closer to each other in each of the color, direction, and frequency. One conceivable illustrative determination method includes the steps of setting directional thresholds DIF_K2, DIF_K3, chromatic thresholds DIF_K4 to K6, and frequency thresholds DIF_K7 to K10, and of comparing them with a difference between the weighting coefficients.

$|K\_AF\_H - K\_IMG\_H| \geq DIF\_K2$      Expression (15-1)

$|K\_AF\_V - K\_IMG\_V| \geq DIF\_K3$      Expression (15-2)

$|K\_AF\_R - K\_IMG\_R| \geq DIF\_K4$      Expression (15-3)

$|K\_AF\_G - K\_IMG\_G| \geq DIF\_K5$      Expression (15-4)

$|K\_AF\_B - K\_IMG\_B| \geq DIF\_K6$      Expression (15-5)

$|K\_AF\_fq1 - K\_IMG\_fq1| \geq DIF\_K7$      Expression (15-6)

$|K\_AF\_fq2 - K\_IMG\_fq2| \geq DIF\_K8$      Expression (15-7)

$|K\_AF\_fq3 - K\_IMG\_fq3| \geq DIF\_K9$      Expression (15-8)

$|K\_AF\_fq4 - K\_IMG\_fq4| \geq DIF\_K10$      Expression (15-9)

DIF_K2 to DIF_K10 are preset values. In the determination expressions (15-1 to 15-9), if any one of the weighting coefficients K_AF_X and K_IMG_X (X=H or V/R or G or B/fq(n)) is larger than the threshold DIF_K, the focus detection information difference is determined large, and the flow moves to the step S5 so as to calculate the correction value. On the contrary, in the determination expressions (15-1 to 15-9), if any one of the weighting coefficients K_AF_X and K_IMG_X (X=H or V/R or G or B/fq(n)) is smaller than the threshold DIF_K, the focus detection information difference is determined small and the flow ends without calculating the BP correction value. While this embodiment performs the determinations for all colors, directions, and frequencies, the present invention may provide the determination only for the frequencies as representative values or may adopt any methods as long as the method uses the focus detection information. Alternatively, in determining the frequency, only the representative frequency fq(n) may be used for the determination.

Thus, before calculating the BP correction value, this embodiment predicts the magnitude of the correction value based on the previously acquired focus detection information, and determines whether the correction value is to be calculated. This method can reduce a calculation load of the correction value for a lens with a small BP correction value in the lens interchangeable type system. Whether the general correction is necessary for a camera having a different setting can be determined by storing the aberration information instead of the BP correction value of the combination of the camera and the lens and by providing a determination based on the focus detection information with the camera set value.

While this embodiment uses the information on the def-MTF peak position (focus lens position that provides a peak of the defocus MTF), the aberration information of the imaging optical system is not limited to this embodiment. For example, a correction value may be calculated using the defocus MTF information.

Fourth Embodiment

A description will now be given of a fourth embodiment according to the present invention. This embodiment is also different from the first embodiment in that this embodiment provides the determination for reducing the calculation load of the BP correction value. Moreover, this embodiment is different from the second and third embodiments in that this embodiment provides the determination based on both the previously acquired BP correction information (aberration information) and focus detection information.

This embodiment also utilizes the block diagram of the image pickup apparatus (FIG. 2), the explanatory views of each focus detection method (FIGS. 3A to 5), the explanatory view of the focus detecting area (FIGS. 6A and 6B), and the focus detection processing and the flowcharts of various focus detection information acquisition (FIGS. 1B, 12, and 13).

Figure 9:
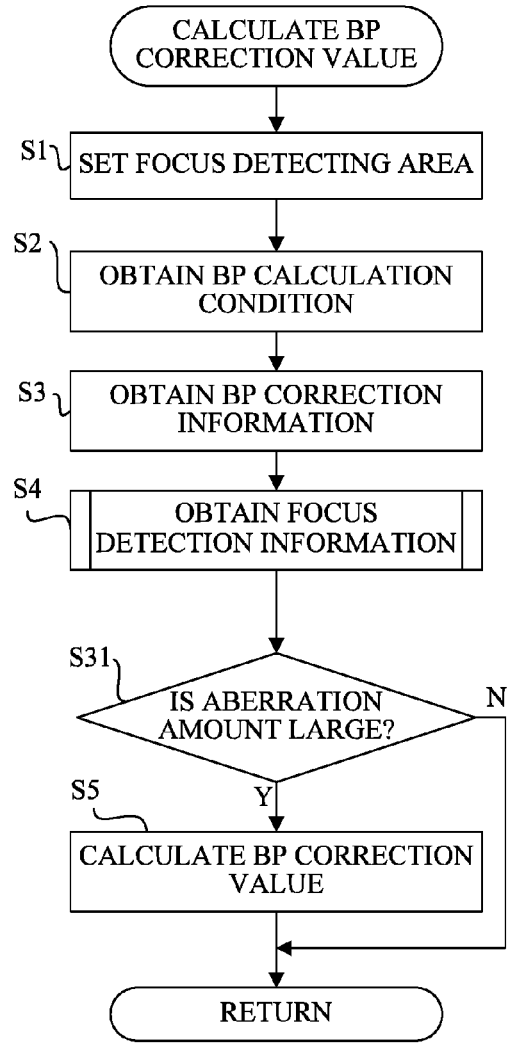
FIG. 9 is a flowchart for explaining an automatic focus detection operation according to a fourth embodiment of the present invention.

Referring now to FIG. 9, a description will be given of a correction value calculating method according to this embodiment.

A series of operations from the step S1 to the step S4 are the same as those in the first embodiment, and a description thereof will be omitted. The processing in the step S4 may be replaced with the processing in the step S11 described in the second embodiment.

In the step S31, the camera MPU 125 determines, based on the BP correction value (aberration information) obtained in the step S3 and the focus detection information acquired in the step S4, whether it is necessary to calculate the BP correction value in the step S5 in the subsequent stage. Thus, the camera MPU 125 in this embodiment serves as a determination unit configured to determine, based on the BP correction information (aberration information) and the focus detection information (weighting information), whether the BP correction value is to be calculated.

A more specific determining method will now be described in detail below. The BP correction information acquired in the step S3 and the focus detection information acquired in the step S4 are in the forms illustrated in FIGS. 11B and 11D, for example, as described above. The curve MTF_P at the defMTF peak position to the spatial frequency in each of the color and direction has a smaller aberrational amount and a smaller correction value calculated in the later stage as the overlap increases.

The calculated BP correction value is smaller as the weighting coefficients K_AF_X and K_IMG_X (X=H or V/R or G or B/fq(n)) are closer to each other in each of the color, direction, and frequency.

The correction amount is calculated based on Expressions (5) and (6), but this embodiment calculates the correction amount by a simpler method and determines whether it is necessary to calculate the correction amount in the step S5 in the subsequent stage.

For example, assume that there are lenses A to C as illustrated in FIGS. 10A, 10B, and 10C, and determination flags Fg_C, Fg_D, and Fg_Fq for the color, a direction, and frequency are previously stored as illustrated in FIG. 10D or calculated through calculations. Reference numeral 1 means a large aberrational amount, and reference numeral 0 means a small aberrational amount. The calculation can use the following determination method (14). For example, in calculating Fg_D, the camera MPU 125 sets the color to G and the frequency to Fq3 so as to fix a component other than the required flag parameter in the color, direction, and the frequency. The flag becomes 1 when Expression (14) is satisfied, whereas the flag becomes 0 when Expression (14) is not satisfied.

As illustrated in FIG. 10A, all of the flags Fg_C, Fg_D, and Fg_Fq become 0 in the lens A. This means that the BP calculation value becomes smaller in all aberration factors (such as the chromatic aberration, the astigmatism, and the spherical aberration). In general, this tendency is applied when the lens has a smaller aberration or the image height set in the step S1 is closer to the image center. The lens B has a large astigmatism since only Fg_D is 1. In general, this tendency is applied when the image height set in the step S1 is closer to the image center. The lens C has a large spherical aberration. In general, this tendency is applied when the image height set in the step S1 is closer to the image center.

Next, Expressions (3) to (7) are calculated only for the factor of the determination flag 1 in FIG. 10D. More specifically, an aberration amount is determined small in the lens A, and the flow does not move to the following step S5 and ends.

In the lens B, BP' for the determination are calculated as follows.

$MTF\_P\_AF(f)=$ $+K\_AF\_G \times K\_AF\_H \times MTF\_P\_GH(f)$ $+K\_AF\_G \times K\_AF\_V \times MTF\_P\_GV(f)$  Expression (16)

$MTF\_P\_IMG(f)=$ $+K\_IMG\_G \times K\_IMG\_H \times MTF\_P\_GH(f)$ $+K\_IMG\_G \times K\_IMG\_V \times MTF\_P\_GV(f)$  Expression (17)

$P\_img = MTF\_P\_IMG(1) \times K\_IMG\_FQ(1)$  Expression (18)

$P\_AF = MTF\_P\_AF(1) \times K\_AF\_FQ(1)$  Expression (19)

$BP' = P\_AF - P\_img$  Expression (7)'

In other words, the camera MPU 125 determines that the BP' correction value (the first correction value) is to be calculated when determining, based on the BP correction information and the focus detection information, that at least one of the chromatic aberration, the astigmatism, and the spherical aberration is larger than a predetermined value. In this embodiment, the camera includes the lens B having the astigmatism larger than the predetermined value, and the camera MPU 125 determines that the BP' correction value is to be calculated. In order to easily calculate the correction value, the BP' correction value is calculated based on part of the BP correction information (aberration information) and part of the focus detection information (weighting information), as expressed by Expressions (16) to (19). If it is found that BP'≥DIF_BP from the preset threshold DIF_BP, the flow moves to the step S5 so as to calculate the correction value since the correction is necessary. In other words, when the BP' correction value is larger than the predetermined value, the BP correction value (second correction value different from the first correction value) is computed based on the BP correction information and the focus detection information. Thus, in this embodiment, the camera MPU 125 serves as a calculation unit configured to calculate the BP' correction value (the first correction value) and the BP correction value (the second correction value). The camera MPU 125 calculates the BP' correction value (the first correction value) with an information amount smaller than that used to calculate the BP correction value (the second correction value).

Similarly, the calculation is made for the lens C as follows.

$MTF\_P\_AF(f) = +K\_AF\_G \times K\_AF\_H \times MTF\_P\_GH(f)$  Expression (20)

$MTF\_P\_IMG(f) = +K\_IMG\_G \times K\_IMG\_H \times MTF\_P\_GH(f)$  Expression (21)

$P\_img = MTF\_P\_IMG(1) \times K\_IMG\_FQ(1) + MTF\_P\_IMG(2) \times K\_IMG\_FQ(2) + MTF\_P\_IMG(3) \times K\_IMG\_FQ(3) + MTF\_P\_IMG(4) \times K\_IMG\_FQ(4)$  Expression (22)

$P\_AF = MTF\_P\_AF(1) \times K\_AF\_FQ(1) + MTF\_P\_AF(2) \times K\_AF\_FQ(2) + MTF\_P\_AF(3) \times K\_AF\_FQ(3) + MTF\_P\_AF(4) \times K\_AF\_FQ(4)$  Expression (23)

$BP' = P\_AF - P\_img$  Expression (7)'

In other words, the camera MPU 125 determines that the BP' correction value (the first correction value) is to be calculated when determining, based on the BP correction information and the focus detection information, that at least one of the chromatic aberration, the astigmatism, and the spherical aberration is larger than a predetermined value. In this embodiment, the camera includes the lens C having the spherical aberration larger than the predetermined value, and the camera MPU 125 determines that the BP' correction value is to be calculated. In order to easily calculate the correction value, the BP' correction value is calculated based on part of the BP correction information (aberration information) and part of the focus detection information (weighting information), as expressed by Expressions (20) to (23). If it is found that BP'≥DIF_BP from the preset threshold DIF_BP, the flow moves to the step S5 so as to calculate the correction value as the correction is necessary. In other words, when the BP' correction value is larger than the predetermined value, the BP correction value (second correction value different from the first correction value) is computed based on the BP correction information and the focus detection information. The camera MPU 125 calculates the BP' correction value (the first correction value) with an information amount smaller than that used to calculate the BP correction value (the second correction value).

Thus, before calculating the BP correction value, this embodiment predicts the magnitude of the correction value based on the previously acquired BP correction information and the focus detection information, and determines whether it is necessary to calculate the correction value. This method can reduce a calculation load of the correction value for a lens with a small BP correction value in the lens interchangeable type system. Whether the general correction is necessary for a camera having a different setting can be determined by storing the aberration information instead of the BP correction value of the combination of the camera and the lens. BP' in this embodiment may be used as a simple correction amount. For example, BP' may be used for the correction in the mode (such as motion image recording) that needs to reduce a calculation load, a motion image mode that requires the camera MPU 125 to perform a focus detection operation for each frame, a multi-point mode that requires the camera MPU 125 to simultaneously process a plurality of focus detecting areas, and a high frame rate mode that requires many frames to be processed per unit time.

While this embodiment uses the information on the defMTF peak position (focus lens position that provides a peak of the defocus MTF), the aberration information of the imaging optical system is not limited to this embodiment. For example, a correction value may be calculated using the defocus MTF information.

Thus, the present invention sets only aberration information having a focus detection error to a target to be corrected, based on one or more pieces of previously stored aberration information, and precisely calculates the focus detection error caused by an aberration of at least one optical system with a minimum calculation load based on the aberration information, the focus detection information, and the object information.

The present invention can provide an image pickup apparatus and its control method, which can precisely calculate a focus detection error caused by an aberration of an optical system with a minimum calculation load by correcting the focus detection result based on the focus state of the object. Therefore, the present invention can provide a control method, an image pickup apparatus, and a computer-readable storage medium, advantageous to the AF of the image pickup apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to an image pickup apparatus, such as a compact digital camera, a single-lens reflex camera, and a video camera.

This application claims the benefit of Japanese Patent Application No. 2016-022746, filed Feb. 9, 2016, which is hereby incorporated by reference herein in its entirety.

What is claimed is:

1. An image pickup apparatus capable of executing automatic focus detection of an imaging optical system, the image pickup apparatus comprising:
   a first acquisition unit configured to acquire aberration information of the imaging optical system;
   a second acquisition unit configured to acquire object information of an object in a focus detecting area;
   a determination unit configured to determine, based on the aberration information, whether it is necessary to obtain color information, angular information, and spatial frequency information of the object;
   a calculation unit configured to calculate, based on the aberration information of the imaging optical system and the object information, a correction value used to correct a difference between a focus state of a captured image and a result of the automatic focus detection, caused by the aberration of the imaging optical system; and
   a correction unit configured to correct the result of the automatic focus detection using the correction value.

2. The image pickup apparatus according to claim 1, wherein the object information contains at least one of color information, angular information, and spatial frequency information of the object in the focus detecting area.

3. The image pickup apparatus according to claim 1, wherein the aberration information of the imaging optical system contains information on at least one of an astigmatism, a chromatic aberration, and a spherical aberration.

4. The image pickup apparatus according to claim 1, wherein the aberration information of the imaging optical system contains information on a plurality of imaging positions each of which corresponds to a maximum value of a modulation transfer function corresponding to one of a plurality of different spatial frequencies.

5. The image pickup apparatus according to claim 4, wherein the calculation unit calculates the correction value based on a result of calculating an imaging position corresponding to a spatial frequency for a focus detection using information of an imaging position of the imaging optical system for each spatial frequency of the object, and a result of calculating an imaging position corresponding to a spatial frequency for the captured image using the information of the imaging position of the imaging optical system for each spatial frequency of the object.

6. The image pickup apparatus according to claim 5, further comprising a setting unit configured to set a first weighting coefficient that depends on a first color, a second color, and a third color in color information of the object, a second weighting coefficient that depends on a first direction and a second direction orthogonal to the first direction in angular information the object, and a third weighting coefficient that depends on spatial frequency information of the object,
wherein the correction unit calculates the correction signal by weighting information of the imaging position of the imaging optical system for each spatial frequency of the object as set by the setting unit.

7. The image pickup apparatus according to claim 6, wherein the correction unit performs a calculation using the aberration information, the first weighting coefficient, and the second weighting coefficient prior to a calculation using the aberration information and the third weighting coefficient.

8. The image pickup apparatus according to claim 1,
wherein the determination unit determines that it is unnecessary to obtain the color information when an amount of the chromatic aberration in the aberration information is smaller than a predetermined value.

9. The image pickup apparatus according to claim 1,
wherein the determination unit determines that it is unnecessary to obtain the angular information when an amount of the astigmatism in the aberration information is smaller than a predetermined value.

10. The image pickup apparatus according to claim 1,
wherein the determination unit determines that it is unnecessary to obtain the spatial frequency information when an amount of the spatial aberration in the aberration information is smaller than a predetermined value.

11. The image pickup apparatus according to claim 1,
wherein the determination unit further determines, based on the object information, whether it is necessary to calculate the correction value.

12. The image pickup apparatus according to claim 1,
wherein the determination unit further determines, based on the aberration information and the object information, that the correction value is to be calculated when at least one aberration among chromatic aberration, astigmatism, and spherical aberration of the object is larger than a predetermined value.

13. A control method for an image pickup apparatus capable of executing automatic focus detection of an imaging optical system, the control method comprising the steps of:
acquiring aberration information of the imaging optical system;
acquiring object information of an object in a focus detecting area;
determining, based on the aberration information, whether it is necessary to obtain color information, angular information, and spatial frequency information of the object;
calculating, based on the aberration information of the imaging optical system and the object information, a correction value used to correct a difference between a focus state of a captured image and a result of the automatic focus detection, caused by the aberration of the imaging optical system; and
correcting the result of the automatic focus detection using the correction value.

14. A non-transitory computer-readable storage medium storing a program that enables a computer to execute a method that includes the steps of:
executing automatic focus detection of an imaging optical system;
acquiring aberration information of the imaging optical system;
acquiring object information of an object in a focus detecting area;
determining, based on the aberration information, whether it is necessary to obtain color information, angular information, and spatial frequency information of the object;
calculating, based on the aberration information of the imaging optical system and the object information, a correction value used to correct a difference between a focus state of a captured image and a result of the automatic focus detection, caused by the aberration of the imaging optical system; and
correcting the result of the automatic focus detection using the correction value.

15. An image pickup apparatus capable of executing automatic focus detection of an imaging optical system, the image pickup apparatus comprising:
a first acquisition unit configured to acquire aberration information of the imaging optical system;
a second acquisition unit configured to acquire object information of an object in a focus detecting area;
a determination unit configured to determine, based on the aberration information, whether it is necessary to obtain color information of the object;
a calculation unit configured to calculate, based on the aberration information of the imaging optical system and the object information, a correction value used to correct a difference between a focus state of a captured image and a result of the automatic focus detection, caused by the aberration of the imaging optical system; and
a correction unit configured to correct the result of the automatic focus detection using the correction value,
wherein the determination unit determines that it is unnecessary to obtain the color information when an amount of the chromatic aberration in the aberration information is smaller than a predetermined value.

16. A control method for an image pickup apparatus capable of executing automatic focus detection of an imaging optical system, the control method comprising the steps of:
acquiring aberration information of the imaging optical system;

acquiring object information of an object in a focus detecting area;
determining, based on the aberration information, whether it is necessary to obtain color information of the object;
calculating, based on the aberration information of the imaging optical system and the object information, a correction value used to correct a difference between a focus state of a captured image and a result of the automatic focus detection, caused by the aberration of the imaging optical system; and
correcting the result of the automatic focus detection using the correction value,
wherein the determining step determines that it is unnecessary to obtain the color information when an amount of the chromatic aberration in the aberration information is smaller than a predetermined value.

17. A non-transitory computer-readable storage medium storing a program that enables a computer to execute a method that includes the steps of:
executing automatic focus detection of an imaging optical system;
acquiring aberration information of the imaging optical system;
acquiring object information of an object in a focus detecting area;
determining, based on the aberration information, whether it is necessary to obtain color information of the object;
calculating, based on the aberration information of the imaging optical system and the object information, a correction value used to correct a difference between a focus state of a captured image and a result of the automatic focus detection, caused by the aberration of the imaging optical system; and
correcting the result of the automatic focus detection using the correction value,
wherein the determining step determines that it is unnecessary to obtain the color information when an amount of the chromatic aberration in the aberration information is smaller than a predetermined value.

* * * * *